United States Patent
Hu et al.

(10) Patent No.: US 12,547,464 B2
(45) Date of Patent: Feb. 10, 2026

(54) SYSTEMS AND METHODS OF HYBRID CENTRALIZED DISTRIBUTIVE SCHEDULING ON SHARED PHYSICAL HOSTS

(71) Applicant: Huawei Cloud Computing Technologies Co., LTD., Gui'an New District (CN)

(72) Inventors: Zhenhua Hu, Markham (CA); Lei Guo, Markham (CA); Jun Wang, Guangdong (CN); Rui Luo, Guangdong (CN); Feng Wang, Guangdong (CN); Cheng Li, Guangdong (CN)

(73) Assignee: HUAWEI CLOUD COMPUTING TECHNOLOGIES CO., LTD., Gui'an New District (CN)

( * ) Notice: Subject to any disclaimer, the term of this patent is extended or adjusted under 35 U.S.C. 154(b) by 680 days.

(21) Appl. No.: 17/966,301

(22) Filed: Oct. 14, 2022

(65) Prior Publication Data
US 2023/0037293 A1 Feb. 9, 2023

Related U.S. Application Data

(63) Continuation of application No. PCT/CN2020/112844, filed on Sep. 1, 2020.

(51) Int. Cl.
G06F 9/50 (2006.01)
G06F 9/48 (2006.01)

(52) U.S. Cl.
CPC .......... *G06F 9/5044* (2013.01); *G06F 9/4881* (2013.01); *G06F 9/50* (2013.01);
(Continued)

(58) Field of Classification Search
None
See application file for complete search history.

(56) References Cited

FOREIGN PATENT DOCUMENTS

| CN | 101938416 A | 1/2011 |
|---|---|---|
| CN | 105577727 A | 5/2016 |

(Continued)

OTHER PUBLICATIONS

International Search Report, dated Jun. 2, 2021, PCT/CN2020/112844 Jun. 2, 2021.
(Continued)

*Primary Examiner* — Qing Yuan Wu

(57) ABSTRACT

Systems and systems for hybrid centralized distributive scheduling and conflict resolution of multiple scheduler instances that share physical resources in a cloud computing system. The cloud computing system includes a plurality of scheduler instances, a global resource manager (GRM) for high-level resource management and conflict resolution for the scheduler instances, and a plurality of physical hosts. Each physical host has a respective local resource manager (LRM). The scheduler instances are responsible for initially processing of scheduling and resource allocation for resource requests, and proposing candidate physical hosts (and respective resource allocation) for the resource requests to the GRM. The GRM is responsible for conflict resolution through its general conflict resolvers of filtering, sorting and counting. The GRM decides which physical hosts among the candidate physical hosts will run the runtime instances of the resource requests after resolving conflicts among the scheduler instances.

32 Claims, 6 Drawing Sheets

(52) U.S. Cl.
CPC .......... *G06F 9/5005* (2013.01); *G06F 9/5022* (2013.01); *G06F 9/5027* (2013.01)

(56) References Cited

FOREIGN PATENT DOCUMENTS

| | | |
|---|---|---|
| CN | 107066319 A | 8/2017 |
| CN | 107450977 A | 12/2017 |
| CN | 109636134 A | 4/2019 |
| CN | 111459684 A | 7/2020 |
| WO | 2019006907 A1 | 1/2019 |
| WO | 2020162800 | 8/2020 |

OTHER PUBLICATIONS

Written Opinion, dated Jun. 2, 2023, PCT/CN2020/112844 Jun. 2, 2021.

Yang Renyu et al: "Performance-Aware Speculative Resource Oversubscription for Large-Scale Clusters", IEEE Transactions on Parallel and Distributed Systems, IEEE, USA, vol. 31, No. 7, Jan. 28, 2020, XP011772794, 19 pages. Jan. 28, 2020.

Jiang Fan et al: "A Cloud-Agnostic Framework to Enable Cost-Aware Scheduling of Applications in a Multi-Cloud Environment", NOMS 2020-2020 IEEE/IFIP Network Operations and Management Symposium, IEEE, Apr. 20, 2020, XP033777635, 9 pages. Apr. 20, 2020.

Grushin D A et al: "On Effective Scheduling in Computing Clusters", Programming and Computer Software, Consultants Bureau, New York, NY, US, vol. 45, No. 7, Dec. 1, 2019, XP036965974, 7 pages. Dec. 1, 2019.

Maria a Rodriguez et al: "Container-based Cluster Orchestration Systems: A Taxonomy and Future Directions", arxiv.org, Cornell University Library, 201 Olin Library Cornell University Ithaca, NY 14853, Jul. 17, 2018, XP081040240, 29 pages. Jul. 17, 2018.

SYSTEMS AND METHODS OF HYBRID CENTRALIZED DISTRIBUTIVE SCHEDULING ON SHARED PHYSICAL HOSTS

CROSS-REFERENCE

This application is a continuation application of PCT Patent Application No. PCT/CN2020/112844 filed Sep. 1, 2020, all the contents of which are incorporated by reference into the DETAILED DESCRIPTION herein below.

TECHNICAL FIELD

Example embodiments relate to cloud computing, and in particular to sharing of physical resources in a cloud computing environment.

BACKGROUND

Cloud computing is a form of network-based computing that enables access to shared pools of configurable computing resources and higher-level services that can be rapidly provisioned with minimal management effort, typically accessible for uses by clients over the Internet. Cloud computing relates to client-server based computing that is implemented as services. Cloud computing service providers generally deliver three main types of services (referred to hereinafter as cloud computing services), infrastructure as a service (IaaS), platform as a service (PaaS), and software as a service (SaaS), by creating virtual machines and containers on demand for use by clients. IaaS provides a computing infrastructure that can be rented and used by clients. The computing infrastructure comprises physical computing resources (e.g. processors, memory, storage, servers, networking components, etc.) that are virtualized and shared among clients. PaaS provides a platform that allows clients to develop, run, and manage software applications without having to build and maintain the computing infrastructure and middleware. SaaS provides software applications running on the computing infrastructure on demand over the Internet on a subscription basis.

Resource requests are typically submitted by clients, applications or other cloud services to central scheduler instances. Resource allocations are made by the central scheduler instances to shared physical computing resources such as physical hosts. Conflicts can arise when multiple allocations are made by different scheduler instances to the same physical host for the same physical resources and there is insufficient capacity from the physical host. Inefficiencies can arise when the physical host has insufficient resources or needs to reject some allocations due to a scheduling conflict, after which some scheduler instances could wait-and-retry or make the allocations to different physical hosts.

In some existing cloud systems, available resources are offered to one central scheduler instance at a time, which can result in unfairness between scheduler instances and can have slow scheduling performance when there are idle resources. In some other existing cloud systems, only a predefined resource sharing policy is used and followed between scheduler instances without coordination, which can lead to underutilized available resources. Some other existing cloud systems rely on a request-and-reject process in which resource requests are attempted to be rescheduled on one host at a time, which is not efficient for different types of runtime instances, and does not resolve filtering or sorting conflicts.

It is desirable to provide hybrid centralized distributive scheduling using a master resource manager responsible for coordinating high level and distributive scheduling processes on other devices.

It is desirable to provide additional scheduling processing performed by the scheduler instances and by a local resource manager on each physical host.

SUMMARY

Example embodiments relate to methods and systems for hybrid centralized distributive scheduling of concurrent heterogeneous scheduler instances that share physical resources in a cloud computing system.

An example embodiment is a cloud computing system that includes a plurality of scheduler instances, a global resource manager (GRM) for high-level resource management for the scheduler instances that allocate resources for resource requests or workloads, and a plurality of physical hosts to provide resources to execute runtime instances of the resource requests. In example embodiments, the GRM is responsible for high level scheduling and conflict resolution.

It would be appreciated that, because the central scheduler instances and GRM had determined the high level resource allocations amongst the physical hosts, the occurrences of scheduling conflicts at the local physical host level are reduced. The central scheduler instances do not need to rely upon a request-and-reject iteration model when interacting with the physical hosts.

In an example, the scheduler instance is responsible for initially processing of scheduling and resource allocation for resource requests, and proposing candidate physical hosts (and respective resource allocation) for the resource requests to the GRM. The GRM resolves conflicts among this scheduler instance and other scheduler instances, decides which physical hosts among the candidate physical hosts will run the runtime instances of the resource requests, and returns the decisions back to the scheduler instance. The GRM is responsible to select the appropriate candidate physical hosts to execute runtime instances of resource requests after resolving scheduling conflicts among candidate physical hosts proposed by the scheduler instances of these resource requests.

In an example, the GRM can be configured to determine the candidate (qualified) physical hosts, and filter out the unqualified physical hosts. In some examples, the filtering performed by the GRM can be performed by the GRM only. In other examples, the filtering performed by the GRM can supplement the initial proposed candidate physical hosts by the scheduler instances.

In an example, each physical host has a respective local resource manager (LRM) for managing local resource allocation arrangement details for executing runtime instances on the respective physical host. The LRM on each physical host is responsible for local arrangement of scheduling and runtime instance execution as instructed from the central scheduler instances. Each scheduler instance can send a resource allocation and runtime details to the LRM of the physical host. The LRM is configured to receive the resource allocations from the various scheduler instances, and run the applicable runtime instances specified in the allocations and their runtime details. The LRM can be configured for continuously reporting capacity (total capacity of resources), availability (available resources), and usage of the respective physical host to the GRM.

It would be appreciated that the LRM for each host is responsible managing the local resource allocation arrangement details for the respective physical host, and therefore the GRM does not need to be responsible for all aspects of the runtime scheduling.

In an example, the scheduler instances are configured to determine, and send to the GRM, scoring or sorting information of each of the candidate physical hosts. In some examples, the scoring information can include weights or other suitability criteria. The GRM can use the received scoring or sorting information to determine the most suitable physical host for a resource request scheduled by each scheduler instance (while still resolving scheduling conflicts). In some examples, the GRM is configured to optimize or improve resource allocation or reclamation costs when selecting of the physical hosts for resource requests scheduled by scheduler instances.

In an example, there are different types of scheduler instances (called heterogeneous) that allocate resources for resource requests of different types of runtime instances that are executed by different types of runtime agents, and the GRM receives and handles resource allocations from the different types of scheduler instances. The GRM can make decisions on high level resource management among the different types of scheduler instances, e.g., resolving conflicts among candidate physical hosts proposed by different types of scheduler instances for their scheduled resource requests.

It would be appreciated that the GRM can resolve conflicts among heterogeneous scheduler instances and their heterogeneous runtime agents, and is not limited to a single type of scheduler instance or runtime agent.

It would be appreciated that the GRM and the LRMs can be continuously informed of the capacity, resource information of the relevant physical host (e.g., availability and usage information), which collectively assist in the coordination of the runtime instances and the scheduler instances between the GRM and the LRMs.

An example embodiment is a method for scheduling and conflict resolution, performed by a global resource manager, including: receiving, from a local resource manager on each of a plurality of physical hosts, resource information of that physical host; receiving, from each of a plurality of scheduler instances each having a respective resource request, respective candidate physical hosts that can accommodate resource allocation of that scheduler instance independent of the other scheduler instances; selecting, for at least one of the scheduler instances, a respective physical host from the respective candidate physical hosts based on the scheduler instances and the resource information that resolves scheduling conflict of the respective resource request of the plurality of scheduler instances; and sending, to the at least one of the scheduler instances, an identification of the selected respective physical host to run at least one runtime instance of the respective resource request scheduled by that scheduler instance.

In an example embodiment of any of the above, first at least one of the scheduler instances is for a first type of runtime instances and second at least one of the scheduler instances is for a second type of runtime instances that is a same type as the first type of runtime instances.

In an example embodiment of any of the above, first at least one of the scheduler instances is for a first type of runtime instances and second at least one of the scheduler instances is for a second type of runtime instances that is a different type than the first type of runtime instances.

In an example embodiment of any of the above, the selecting further comprises selecting a same physical host for first at least one of the scheduler instances and second at least one of the scheduler instances.

In an example embodiment of any of the above, the selecting further comprises selecting first at least one of the physical hosts for the first at least one of the scheduler instances and selecting second at least one of the physical hosts for the second at least one of the scheduler instances, wherein the first at least one of the physical hosts are different than the second at least one of the physical hosts.

In an example embodiment of any of the above, the method further includes reserving resources on the first at least one of the physical hosts in a first resource pool for resource requests of the first type of runtime instances and reserving resources on the second at least one of the physical hosts in a second resource pool for resource requests of the second type of runtime instances.

In an example embodiment of any of the above, the method further includes releasing the reserved resources on the first at least one of the physical hosts or the second at least one of the physical hosts in the respective resource pool when the reserved resources on the respective physical host are no longer needed.

In an example embodiment of any of the above, the method further includes migrating workloads from the first at least one of the physical hosts to another at least one of the physical hosts to cause the first at least one of the physical hosts to have more resources idle so that the resource of the respective physical host can be reserved in the respective resource pool.

In an example embodiment of any of the above, the first type of runtime instances is one type of virtual machines, containers, pods, or nodes; and the second type of runtime instances is a different type of the virtual machines, the containers, the pods, or the nodes.

In an example embodiment of any of the above, each scheduler instance is configured to cut off unqualified physical hosts in order to determine qualified physical hosts as the respective candidate physical hosts.

In an example embodiment of any of the above, the unqualified physical hosts are one type of physical hosts that are more expensive than another type of physical hosts that is determined as the qualified physical hosts.

In an example embodiment of any of the above, the selecting of the respective physical host is for at least two of the scheduler instances, and wherein the sending of the identification of the selected respective physical host is to at least two of the scheduler instances.

In an example embodiment of any of the above, the method further includes, after the receiving the resource information, sending the resource information to the scheduler instances.

In an example embodiment of any of the above, the method further includes repeating the receiving of the resource information to monitor the at least one runtime instance.

In an example embodiment of any of the above, the resource allocation includes a reclamation of resources from one of the physical hosts.

In an example embodiment of any of the above, the resource information includes real-time actual resource usage information or scheduled resource allocation information of the respective physical host.

In an example embodiment of any of the above, the sending to at least one of the scheduler instances includes sending a scheduled quantity of the resource allocation for the selected respective physical host, and without sending local resource allocation arrangement details for the at least one runtime instance on the selected respective physical host.

In an example embodiment of any of the above, each respective local resource manager receives information from the global resource manager and runtime agents on that physical host, and is configured to perform local resource allocation arrangement for that physical host without receiving local resource allocation arrangement details.

In an example embodiment of any of the above, the local resource allocation arrangement details include local scheduling, local conflict resolution and local optimization.

In an example embodiment of any of the above, the local resource allocation arrangement details include detailed placements on local resources, local resource sharing, isolation, binding, placement, replacement, or migration.

In an example embodiment of any of the above, at least one physical host is configured with a plurality of non-uniform memory access nodes, wherein the local resource allocation arrangement details for the at least one physical host include migrating local resource allocation from a first non-uniform memory access node to a second non-uniform memory access node.

In an example embodiment of any of the above, the method further includes receiving, from each of the plurality of scheduler instances, scoring or sorting information of the respective candidate physical hosts for that scheduler instance, wherein the selecting of the respective physical host for that scheduler instance is further based on the received scoring or sorting information.

In an example embodiment of any of the above, the scoring or sorting information is generated by the respective scheduler instances based on: spreading, stacking, application proximity, fragment reduction, interference reduction, or spread resilience, or a combination or sub-combination thereof.

In an example embodiment of any of the above, the scoring information includes weights for ranking the respective candidate physical hosts from one or more of the spreading, the stacking, the application proximity, the fragment reduction, the interference reduction, or the spread resilience.

In an example embodiment of any of the above, the method further includes the global resource manager resolving scoring or sorting conflicts from the received scoring or sorting information between the candidate physical hosts prior to the selecting of the respective physical host from the respective candidate physical hosts.

In an example embodiment of any of the above, the resolving scoring or sorting conflicts is based on cost of each of the plurality of physical hosts.

In an example embodiment of any of the above, the method further includes the global resource manager filtering out at least one of the received respective candidate physical hosts as unqualified physical hosts prior to the selecting of the respective physical host from the respective candidate physical hosts.

In an example embodiment of any of the above, the selecting of the respective physical host from the respective candidate physical hosts for that scheduler instance is further based on optimizing the resource allocation or reclamation costs of all of the scheduler instances.

In an example embodiment of any of the above, the optimizing includes optimizing performance, isolation and resource usage of the physical hosts.

In an example embodiment of any of the above, the scheduling conflict is resolved by spreading, stacking, application proximity, fragment reduction, interference reduction, or spread resilience, or a combination or sub-combination thereof.

In an example embodiment of any of the above, the scheduling conflict is resolved by weighting one or more of the spreading, the stacking, the application proximity, the fragment reduction, the interference reduction, or the spread resilience.

In an example embodiment of any of the above, the resource information includes allocation information, usage information, or both the allocation information and the usage information.

In an example embodiment of any of the above, the method further includes receiving a conflict resolution request from at least one of the scheduler instances, wherein the selecting is performed for a mini-batch of the received conflict resolution request from the at least one of the scheduler instances of the respective candidate physical hosts within a specified time interval.

In an example embodiment of any of the above, the selecting of the respective physical host from the respective candidate physical hosts selects less than all of the plurality of physical hosts.

In an example embodiment of any of the above, the method is performed by at least one processor external to the physical hosts.

In an example embodiment of any of the above, the method further includes sending, to the local resource manager of the selected respective physical host, that the selected respective physical host is to run at least one runtime instance of the respective resource request.

Another example embodiment is a method for facilitating scheduling and conflict resolution, the method performed by a scheduler instance, including: receiving a resource request for a resource allocation; receiving resource information of a plurality of physical hosts; selecting, based on the resource information, an identification of respective candidate physical hosts that can accommodate the resource allocation of the resource request independent of resource requests of other scheduler instances; sending a conflict resolution request and the identification of the respective candidate physical hosts to a global resource manager; receiving from the global resource manager, an identification of a physical host from the respective candidate physical hosts that resolves scheduling conflict; and sending, to a runtime agent of the identified physical host, the resource allocation for the identified physical host to run at least one runtime instance of the resource allocation.

In an example embodiment of any of the above, the selecting includes filtering out unqualified physical hosts in order to determine qualified physical hosts as the respective candidate physical hosts.

In an example embodiment of any of the above, the unqualified physical hosts are one type of physical host that are more expensive than another type of physical host that is determined as the qualified physical hosts.

In an example embodiment of any of the above, the method further includes scoring or sorting the respective candidate physical hosts and generating scoring or sorting information, and sending the scoring or sorting information to the global resource manager.

In an example embodiment of any of the above, the generating the scoring or sorting information based on: spreading, stacking, application proximity, fragment reduction, interference reduction, or spread resilience, or a combination or sub-combination thereof.

In an example embodiment of any of the above, the scoring information includes a weighting generated from one or more of the spreading, the stacking, the application proximity, the fragment reduction, the interference reduction, or the spread resilience.

Another example embodiment is a method for facilitating scheduling and conflict resolution, the method performed by a local resource manager of a physical host, including: sending resource information of the physical host to a global resource manager; receiving, from a first runtime agent or from the global resource manager, without receiving local resource allocation arrangement details, a scheduled quantity of first resource allocation for the physical host to run at least one first runtime instance of the first runtime agent; and receiving, from a second runtime agent of a different type than the first runtime agent, or from the global resource manager, without receiving the local resource allocation arrangement details, a scheduled quantity of second resource allocation for the physical host to run at least one second runtime instance of the second runtime agent; and performing local scheduling, local conflict resolution and local optimization within the physical host for concurrent running of the at least one first runtime instance and the at least one second runtime instance that resolves scheduling conflict of the at least one first runtime instance and the at least one second runtime instance.

Another example embodiment is a computing system, including: a plurality of scheduler instances, each scheduler instance configured to receive a resource request for a resource allocation; a plurality of physical hosts, each physical host having a local resource manager configured to transmit resource information of that physical host; a global resource manager; and at least one processor configured to perform any of the above methods.

Another example embodiment is a non-transitory computer-readable medium which stores instructions that, when executed by one or more processors, causes the one or more processors to perform any of the above methods.

BRIEF DESCRIPTION OF THE DRAWINGS

For a more complete understanding of example embodiments, and the advantages thereof, reference is now made to the following description taken in conjunction with the accompanying drawings, in which.

Similar reference numerals may have been used in different figures to denote similar components.

DETAILED DESCRIPTION

Figure 1:
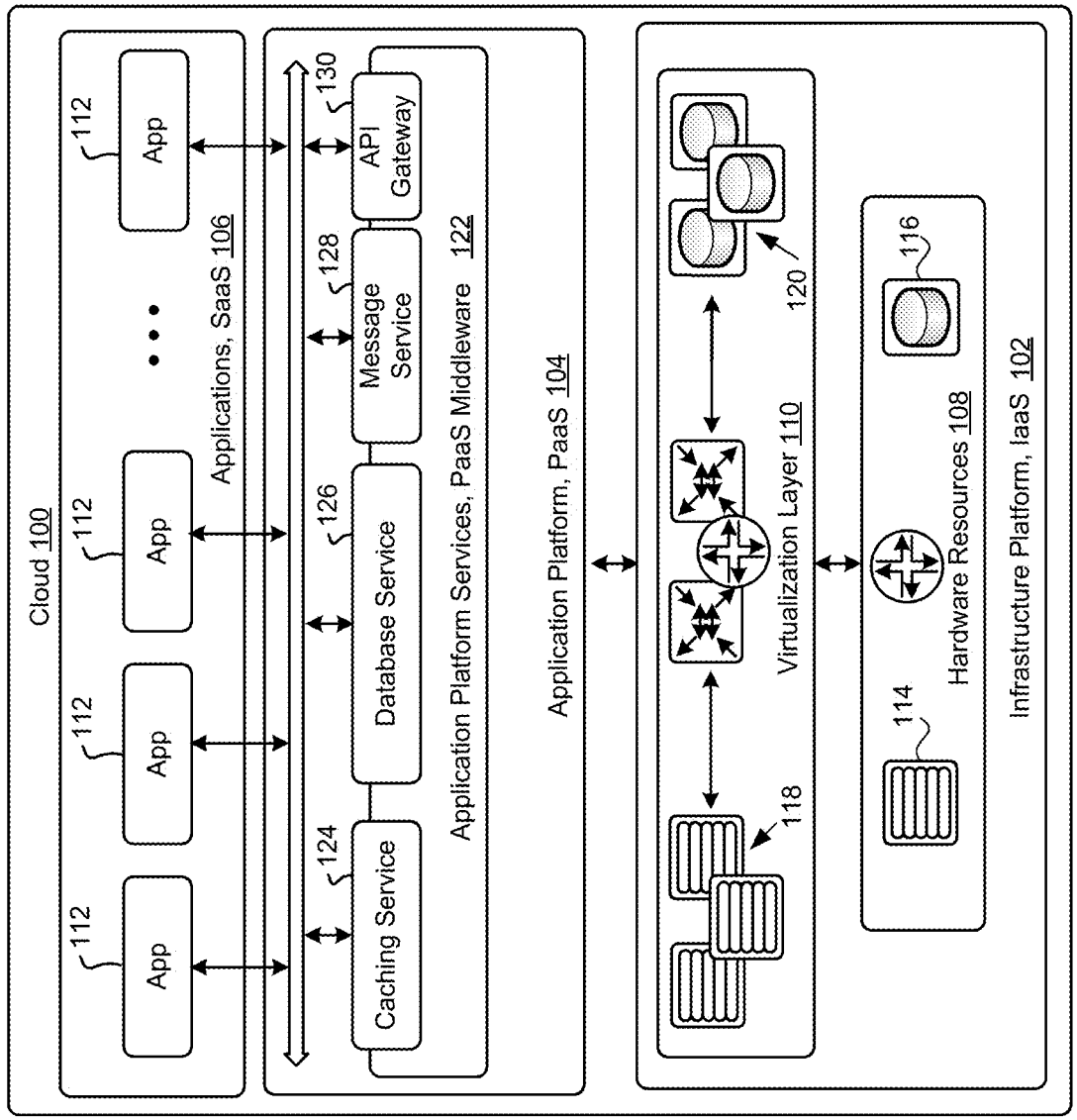
FIG. 1 is a block diagram illustrating an example cloud computing system, in accordance with some example embodiments.

In a cloud data center, clients (e.g., customers) need to run many different applications that are developed, packaged and deployed in different forms using new and old technologies, eco-systems, and runtime instances such as virtual machines (VMs), Docker™ containers, Kubernetes™ (K8s) pods, Java™ virtual machines (JVMs), and others. Usually in cloud use cases there are enough physical resources in a cluster to meet all the on-demand requests to run the runtime instances as soon as possible. When a certain percent of the resources have been sold to the current on-demand users, more physical resources may be added in the cluster to prevent "sold-out" scenarios.

A physical host is a physical hardware resource, typically a physical machine or device configured to provide data or services. For example, a server can be a physical host. A virtual machine (VM) is an emulation of a computer system. A physical host can be used to execute a VM. In a cloud data center, there can be physical hosts that can be used to process runtime instances from various runtime requests.

In order to run the runtime instances on the shared physical hosts in a cluster for the best resource utilization, lowest cost, shortest request waiting time, and highest scheduling performance, instead of otherwise done by resource silos, resource sharing is needed to allow different runtime instances to share not only physical hosts in the cluster, but also resources within a physical host such as graphics processing units (GPUs), Non-uniform memory access (NUMA)/memory nodes, a one central processing unit (CPU), or CPUsets (which can include NUMA nodes or CPUs).

A scheduler instance is a processor-implemented module that receives resource requests (e.g. from clients or applications) and sources those resource requests from physical hosts. It is difficult or unrealistic to have a monolithic master scheduler to schedule all these heterogeneous runtime instances because they are best natively scheduled using different objects and settings from different eco-systems. For example, K8s node/pod affinity scheduling requests cannot be scheduled by a different type of scheduler instance. For scalability and performance reasons, multiple concurrent scheduler instances are often used, for requests of the same type or of different types. Different types of scheduler instances can be called heterogeneous.

When there are multiple concurrent scheduler instances, the cloud needs to resolve scheduling conflicts among requested resource allocations that compete for the same physical resources. The conflict resolution becomes harder if these instances come from heterogeneous scheduler instances.

It is difficult to resolve the conflicts if the scheduler instances decide too many details in resource allocations on the physical hosts such as CPUsets, GPUs, NUMA/memory nodes, which CPU to bind, etc.

The Mesos™ Resource Manager is an existing application that supports multiple scheduler instances by offering global resources to one scheduler instance after another. There is no conflict resolution between the scheduler instances. Example problems with the Mesos™ Resource Manager include unfairness among scheduler instances and slow scheduling performance when there are idle resources.

Other existing applications include Hadoop™ Resource Manager and IBM™ Platform EGO, which support multiple application scheduler instances by predefined resource sharing policies among the application scheduler instances. Example problems include not all global resources being available to every scheduler all the time and slow scheduling performance when there are idle resources.

Other existing applications include Google™ Borg and Omega™, which support multiple scheduler instances by offering global resources to multiple scheduler instances at the same time, and resolving conflicts by optimistic concurrency to try and retry allocating one host at a time for a request. Problems are that the conflict resolution is not efficient for multiple heterogeneous scheduler instances, and may not resolve filtering and sorting conflicts.

The above-noted existing solutions do not have local resource management which can do local scheduling, conflict resolution and optimization within a physical host. Optimization means to perform operations that improve a result, rather than being limited to the best result. Local resource management can offload, coordinate and balance with central scheduling, and greatly reduce conflicts in central scheduling, for scheduling performance in a large cluster.

Example embodiments relate to systems and methods to effectively and efficiently reduce and resolve the filtering, sorting and countable resource conflicts among the scheduler instances at the cluster level by using a global resource manager (GRM), which is processor-implemented. The global resource manager (GRM) is for high-level resource management for the scheduler instances. The GRM has particular processing details of the scheduling being distributed to other devices, which is therefore referred to herein as hybrid centralized distributive scheduling. The GRM is responsible for high level scheduling and conflict resolution, and other scheduling functions are performed by the scheduler instances and by a local resource manager (LRM) which is processor-implemented on each physical host.

In example embodiments, scheduler instances send, to the GRM, shortlists of top candidate physical hosts of each resource request provided by the scheduler instances. The GRM can also receive sorting information such as host sorting scores from the scheduler instance and common sorting criteria.

In some examples, the LRM is provided in each physical host to reduce conflict occurrences at the cluster level. The LRM offloads detailed scheduling and conflict resolution from the scheduler instances and GRM to the local host level, and the LRM can be configured to use local resource sharing, isolation, binding of NUMA, CPU, GPU, and PCIe (peripheral component interconnect express), placement, replacement, and migration, and optimization within the physical host of the LRM.

In some examples, the GRM can resolve the scheduling conflicts of the scheduler instances in mini-batches, each mini-batch containing one or more conflict resolution requests.

Some example embodiments of the cloud can be used for resource reclamation requests, which are the reverse operations of resource requests, to reclaim resources that are already allocated to applications in the cluster or physical host. For reclamation, an example sorting score can be the cost of a reclamation, and the conflict would happen when multiple requests are reclaiming the same reclaimable resources on a physical host.

FIG. 1 is a logical block diagram schematically illustrating architecture of a cloud computing system (also referred to as cloud 100) that can deliver cloud computing services. The illustrated cloud 100 generally comprises an infrastructure platform 102 (e.g. IaaS layer), an application platform 104 (e.g. PaaS layer), and applications 106 (e.g., SaaS layer). The infrastructure platform 102 comprises the physical hardware resources 108, and a virtualization layer 110 that presents an abstraction of the physical hardware resources 108 to the application platform 104. The abstraction presented by the virtualization layer 110 depends on the requirements of the applications 112 being hosted on the application platform 104. The physical hardware resources 108 include physical machines 114 that include processing resources (e.g., central processing units (CPUs), graphic processing units (GPUs), accelerators, tensor processing units (TPUs)), physical storage 116 that include storage resources such as memory (e.g., static random access memory (SRAM), dynamic random access memory (DRAM), synchronous DRAM (SDRAM), read-only memory (ROM), persistent storage devices (e.g. hard disk drives, optical drives) or a combination thereof), and connectivity resources (not shown) that are generally resident within a data center. An example of connectivity resources is networking resources, and any example embodiments that include connectivity resources can similarly include networking resources. A data center, as will be understood in the art, includes a collection of the physical hardware resources 108 (typically in the form of servers) that can be used as a collective computing resource comprising processing, storage, and connectivity resources. Within a data center, a plurality of servers can be connected together to provide a computing resource pool upon which virtualized entities can be instantiated. Data centers can be interconnected with each other to form pools of computing resources connected to each by connectivity resources. The connectivity resources may take the form of physical connections such as Ethernet or optical communications link.

A physical host refers to a particular subset of the physical hardware resources 108, typically each server is one physical host. Each individual physical host include a subset of the physical machines 114 and the physical storage 116. In other examples, one server may have more than one physical host (with separate physical hardware resources 108). A group of physical hosts can be referred to as a cluster.

The virtualization layer 110 supports a flexible and efficient multi-tenancy run-time and hosting environment for applications 112 by providing Infrastructure as a Service (IaaS) facilities. The virtualization layer 110 includes a virtualization manager or hypervisor (not shown) that may provide a security and resource "sandbox" for each application 112 being hosted by the application platform 104. Each "sandbox" may be implemented as a Virtual Machine (VM) 118 in a physical host that may include an appropriate operating system and controlled access to virtualized storage resources 120. An example implementation of a VM is a Java™ Virtual Machine (JVM).

The virtualization of the physical hardware resources 108 by the virtualization layer 110 is considered to be foundational technology for the cloud 100. Virtualization of is a technology that allows for the creation of virtual computing resource pools of computing resources (e.g., processing, storage, and connectivity resources) connected to each by the connectivity resources. Virtualization may take the form of instantiating VMs 118 that, to another entity on a network and to software executed on the VM 118, is no different than a physical computing device. A VM 118 has its own set of computing resources (e.g. processing, storage, and connectivity resources), upon which an operating system can be executed. The VM 118 can have a virtual network interface that can be assigned a network address. Between the underlying resources and the VM 118, there is typically a hypervisor (not shown) that manages the resource isolation and network interactions. One of the purposes of a VM 118 is to provide isolation from other processes running on the cloud 100. When initially developed, a VM 118 was a mechanism to allow different processes to operate without concern that a single errant process would be able to cause a complete system crash. Instead, an errant process would be contained to its own VM 118. This isolation allows for each VM 118 to have its own set of network interfaces. Typically, a single underlying computing resource can support a plurality of virtualized entities.

It will be appreciated by those skilled in the art that containers may be used in place of VMs 118. As mentioned above, each VM 118 typically includes its own operating system which typically increases redundant computing, storage, and connectivity resource usage. Containers allow a single operating system (OS) kernel to support a number of isolated applications. In place of a hypervisor that allows each VM 118 to run its own OS, a single OS hosts containers that are responsible for enforcing the resource isolation that would otherwise be provided by the VM 118. An example application that implements containers is Kubernetes™ (K8s).

The application platform 104 provides the capabilities for hosting applications 112 and includes application platform services 122. The application platform services 122 provide a set of middleware application services and infrastructure services to the applications 112 hosted on the application platform 104. Applications 112 hosted on the application platform 104 may run on either the VMs 118 or the physical machines 114. In the example embodiment depicted in FIG. 1, the application platform services 122 include a cloud caching service system 124 for in-memory data storage, a database service 126 for applications, a message service 128 for publishing messages to subscriber clients, and an application program interface (API) gateway service that enables clients to create, publish, and maintain application program interfaces (APIs) to access other cloud services. It will be appreciated by those skilled in the art that the applications 112 may provide other middleware application services to clients, such as notification services, run-time services, and the like. Applications 112 from clients may be deployed and executed within a respective VM 118 or physical machine 114.

Example resources of the cloud 100 include processing resources, storage resources, and connectivity resources. For example, any or all of these resources can be allocated for instantiating a VM 118 or for implementing a container application. In some examples, resources can be reclaimed, which can be considered reversing or subtracting from a particular resource allocation of one of the resources.

A workload for the cloud 100 refers to a discrete capability or amount of work that is desired to be, or is, run as a runtime instance on the cloud 100. For example, the workload can be for a web server, a container, or a Hadoop™ node.

Figure 2:
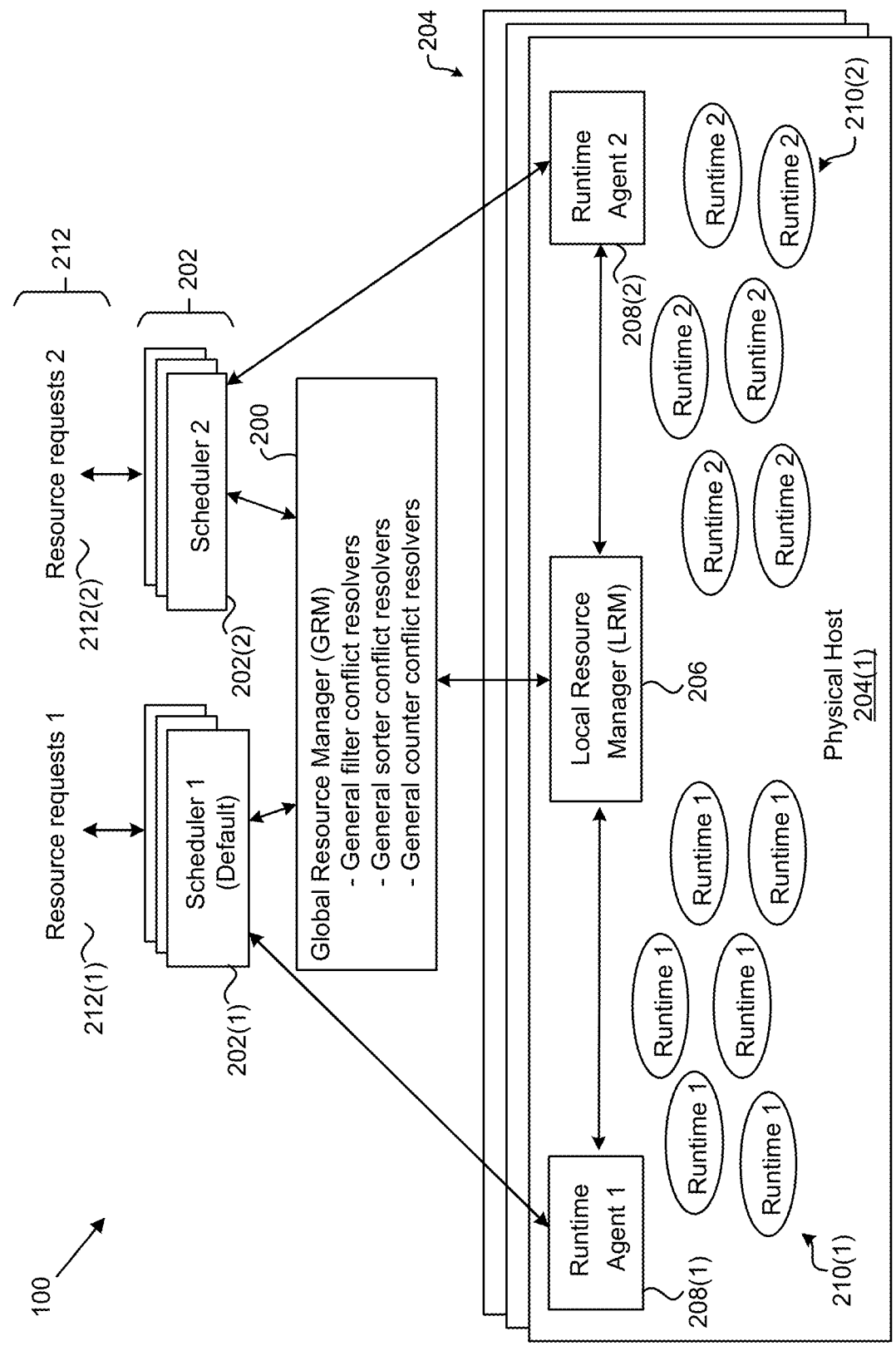
FIG. 2 is a block diagram of the cloud computing system implementing centralized distributive scheduling on shared physical hosts, in accordance with an example embodiment.

FIG. 2 is a block diagram illustrating the cloud 100 implementing hybrid centralized distributive heterogeneous scheduling of multiple scheduler instances on shared physical hosts, in accordance with an example embodiment. As shown in FIG. 2, the cloud 100 includes a GRM 200, a plurality of scheduler instances 202, and a plurality of physical hosts 204 are in parallel. "Hybrid centralized distributive" refers to the GRM 200 performing global centralized processing of some aspects of scheduling, resource management and conflict resolution with other local aspects of scheduling and resource management being performed by other devices directly affected by those local aspects, such as the scheduler instances 202 and the physical hosts 204. In some examples, the GRM 200 includes general filter conflict resolvers, general sorter conflict resolvers, and general counter conflict resolvers.

In example embodiments, each physical host 204 includes a LRM 206. The GRM 200 works with each LRM 206 and acts as a centralized scheduler and resource manager to co-ordinate the desired resource allocations and resolve conflicts among scheduler instances 202. The LRM 206 of each physical host 204 is configured to perform the detailed runtime instance arrangement to the applicable allocated resources within the respect physical host 204 of that LRM 206. The LRM 206 of each physical host 204 can perform local scheduling, conflict resolution and optimization within the respective physical host 204. Therefore, in some example embodiments, neither the GRM 200 nor the scheduler instances 202 are responsible for the detailed scheduling arrangement of local resources of the physical host 204 for the runtime instance.

The detail of one physical host 204(1) is illustrated in FIG. 2, and which includes the LRM 206 and one or more runtime agents, e.g. runtime agent 1 (208(1)) and runtime agent 2 (208(2)). Each runtime agent 208(1), 208(2) can execute one or more respective runtime instances using physical resources of the physical hosts 204, in the present example runtime agent 1 (208(1)) is configured to execute a plurality of respective runtime instances (runtime 1 (210(1))) for the physical host 204(1), and runtime agent 2 (208(2)) is configured to executed a plurality of respective runtime instances (runtime 2 (210(2))) for the same physical host 204(1). The resources for runtime 1 and runtime 2 do not overlap on the physical host 204(1) and so can be run concurrently without scheduling conflict. The other physical hosts 204 can be configured in a similar fashion. The GRM 200 coordinates high level selection of which physical host 204 is to perform which runtime instance and the quantity of resource allocation to be performed on that physical host 204 to run the applicable runtime instance. Each runtime agent 208(1), 208(2) executes the detailed implementation of their runtime instances in consultation with the LRM 206. In some examples, runtime 1 (210(1)) and runtime 2 (210(2)) are configured to execute different types of runtime instances, which can be referred to as heterogeneous runtime instances.

As shown in FIG. 2, the scheduler instances 202 include a plurality of first scheduler instances, having a first type, one of which is illustrated as scheduler 1 (202(1)). The scheduler instances 202 include a plurality of second scheduler instances, having a second type, one of which is illustrates as scheduler 2 (202(2)). In example embodiments, the first type of scheduler instance and the second type of scheduler instance are different types of scheduler instances. For example, the first type of scheduler instance can be OpenStack™ virtual machines (VMs); and the second type of scheduler instance is Kubernetes pods or containers. Different types of scheduler instances can be referred to as heterogeneous scheduler instances. In example embodiments, the schedule instances 202 can include even further different types of scheduler instances (not shown here).

In example embodiments, each scheduler instance 202 is in communication with a respective runtime agent 208(1), 208(2) that is configured to particularly handle that particular type of scheduler instance. As well, each scheduler instance 202 can receive, from the GRM 200, usage, availability and capacity data in relation to all of the physical hosts 204 in order to assess candidate physical hosts and conduct scheduling of required resource allocations. In the example of FIG. 2, scheduler 1 (202(1), which can be referred to as S1) is configured for communication with runtime agent 1 (208(1)) and scheduler 2 (202(2), which can be referred to as S2) is configured for communication with runtime agent 2 (208(3)).

The scheduler instances 202 of different types receive, from the GRM 200, the current global resource availability and usage states of all physical hosts in a cluster. In cloud computing systems a resource scheduler instance usually performs three steps to schedule a resource request: a) filtering to get a qualified list of physical hosts that can meet all the constraints and have enough remaining resources; b) sorting the (qualified) physical hosts, and c) selecting a physical host from the sorted list.

The scheduler instances 202 can be configured to receive resource requests 212 (which can be referred to as "resreq"). In the example of FIG. 2, scheduler 1 (202(1)) and other scheduler instances of the first type can receive resources requests 1 (212(1)) of the first type to launch runtime instances of the first type. Similarly, scheduler 2 (202(2)) and other scheduler instances of the second type can receive resources requests 2 (212(2)) of the second type to launch runtime instances of the second type.

In some examples, each scheduler instance 202 is further configured to receive, from the GRM 200, capacity, resource information (e.g. availability and usage information) relating to all of the physical hosts 204. The scheduler instances 202 receives, from the GRM 200, global resource usage states of all of the physical hosts 204 in a given cluster, and schedules resource requests of different types of runtime instances. In example embodiments, the scheduler instances 202 can be either allocating or reclaiming resources. There can be more than two types of scheduler instances 202 in some examples.

The scheduler instance 202 can then fulfill the respective resource requests 212 by first proposing to the GRM 200 which physical hosts 204 are able to run the received resource requests 212, called candidate physical hosts. The proposal from the scheduler instance 202 to the GRM 200 also includes the amount of resource allocation, and the type of runtime instance. In some examples, each scheduler instance 202 is configured to the determine, from the type of physical host, capacity, resource information, which of the physical hosts 204 is a candidate physical host that can accommodate the desired resource allocation of that scheduler instance 202. At this stage, the scheduler instances 202 are not coordinated with each other and the possible candidate physical hosts are determined by each scheduler instance 202 independent of the other scheduler instances 202.

In some examples, each scheduler instance 202 first filters out the unqualified physical hosts 204, for example those physical hosts 204 that cannot handle a certain type of request or does not have sufficient capacity to handle the certain type of request. In some examples, the scheduler instances 202 are configured to determine and provide to the GRM 200 additional scoring or sorting information in relation to the qualified candidate physical hosts. For example, a scheduler instance 202 can score or sort the physical hosts 204 (or alternatively only the qualified candidate physical hosts 204) based on the resource requests 121, the real-time or scheduled capacity, availability or usage data of each physical host 204, and send the resultant scoring or sorting information of the candidate physical hosts 204 to the GRM 200 for further consideration so that the GRM 200 can make the ultimate high-level scheduling decisions..

In some examples, the scheduler instance 202 can further filter out physical hosts 204 as candidate physical hosts based on the scoring information, for example having specific cutoff thresholds or a specified number of candidate physical hosts to present to the GRM 200.

The GRM 200 is responsible for resolving scheduling and resource allocation conflicts among scheduler instances. In some examples, the GRM 200 can be configured to optimize resource allocation or reclamation costs.

The GRM 200 receives, from each scheduler instance 202, multiple respective candidate hosts for each resource request which are scheduled by scheduler instances 202. The GRM 200 resolves filtering, sorting and counting conflicts among the scheduler instances for their respective resource requests, and decides which physical host 204 to run the runtime instance of each resource request. The GRM 200 then sends the conflict resolution results back to the scheduler instances 202, including identification which physical host 204 is to run the runtime instance for the resource request. In some embodiments, as shown in FIG. 2, scheduler 1 202(1) can be a default scheduler. In some example embodiments, the GRM 200 and the default scheduler instance 202(1) can be implemented in one component so that they can share the same filtering, sorting and counting framework.

In example embodiments, the scheduler instances 202 communicate with their corresponding types of runtime agents 208(1), 208(2) to launch the different types of runtime instances 210(1), 210(2), using the resources and the quantity of resource allocation as scheduled by the scheduler instances 202 and decided by the conflict resolution of GRM 200.

The LRM 206 is responsible for the local arrangement details of the resource allocation and runtime instances on each physical host 204. The LRM 206 on each physical host 204 makes sure that resources allocated to the runtime instances 210(1), 210(2) on the physical host 204 will not exceed the host resource capacities. The LRM 206 also coordinates among different runtime agents 208(1), 208(2), and makes local scheduling decisions to place or replace runtime instances on NUMA, CPU, GPU, memory and PCIe devices in the local physical host 204 to optimize performance, isolation and resource usages of requested workloads on the local physical host 204. Each LRM 206 communicates with the GRM 200 to report its "heartbeat", including usage or resource information (actual or scheduled), and synchronize resource allocations decided by the GRM 200 and actual usages on the local physical host 204.

The different types of runtime agents 208(1), 208(2) on each physical host 204 communicate with the LRM 206 and their corresponding scheduler instances 202(1), 202(2). The runtime agents 208(1), 208(2) work with operating system (OS) and virtualization and container sub-systems on the local physical host 204, and launch and monitor their respective type of runtime instance natively for their corresponding types of scheduler instances 202(1), 202(2).

The LRM 206 collects information in relation to their respective host physical resources and topologies, and reports them to the GRM 200 for global resource scheduling and conflict resolution. In example embodiments, the LRM 206 can directly call operating system commands to collect resources, or the LRM 206 can also interact with each runtime agent 208(1), 208(2) to collect resource information. In some example embodiments, the LRM 206 and runtime agents 208(1), 208(2) can be implemented in one component.

Scheduler instances 202(1), 202(2) receive, from the GRM 200, the current global resource availability and usage states of all of the physical hosts 204 in the cluster. In example embodiments, the scheduler instance 202(1), 202(2) can still have its own ecosystem-specific resource filters to filter out non-candidate physical hosts and determine the candidate physical hosts. Each scheduler instance 202(1), 202(2) has a respective sorter to score the candidate physical hosts and then sort the candidate physical hosts, based on their score, for a request of either resource allocation or reclamation.

In example embodiments, each scheduler instance 202(1), 202(2) can cut off a shortlist of top candidate hosts of the request, and send the shortlist to the GRM 200 for conflict resolution. For resource allocation, the GRM 200 makes sure that the countable resources (such as CPU cores, memory, GPU, IO bandwidth, storage space) on a physical host 204 will not become negative after deducting the resource allocation amounts required by all of the resource requests from all of the scheduler instances 202.

In example embodiments, the GRM 200 can have qualification rules to resolve filtering conflicts to filter out or disqualify one or more of the received candidate physical hosts in the shortlist received from each scheduler instance 202(1), 202(2). For example, if certain resources such as GPU are more expensive than other resources such as CPU, there can be a general rule in GRM 200 saying "any physical host that has a number of unused GPUs is disqualified to be allocated to a resource request that does not require GPUs". In general, workloads require at least some CPUs and memory to run. Only some special workloads require GPUs in addition to CPUs and memory. Such a general rule can prevent a situation from happening, in which CPUs or memory of a particular GPU physical host are used up, but some of its expensive GPUs are left over and wasted.

In example embodiments, the scheduler instance 202(1), 202(2) can determine, and send to the GRM 200, a respective final overall score "SchedulerSortScore" for each candidate physical host 204 in the shortlist to show by how much a physical host 204 is more preferred than others for resource allocation or reclamation. For reclamation, a preferred physical host 204 means less reclamation cost, each physical host 204 may include a list of existing candidate request allocations to be preempted. This way, the GRM 200 can pick a host top-down from the list and randomly among some physical hosts 204 that have the same score in the shortlist.

In example embodiments, the scheduler instance 202(1), 202(2) can also include a collection of common sorting criteria scores for each physical host 204 in the shortlist from the scheduler instance 202(1), 202(2), so that the GRM 200 does not have to score the physical hosts 204 with any GRM sorters. For example, example criteria for scoring include spreading, stacking, application proximity, fragment reduction, interference reduction, or spread resilience (respectively referred to as the following variable or policy: Spreading, Stacking, AppProximity, ReduceFragment, ReduceInterference, or SpreadResilience). In an example embodiment, the scoring is known by all of the scheduler instances 202(1), 202(2) and the GRM 200. The GRM 200 can optionally have its own GRM sorter to score a physical host on these example criteria, as well as consider its own weights to combine scores from multiple criteria into one final sorting score. The GRM 200 therefore resolves conflicts in sorting policies among scheduler instances and the GRM 200. For example, if some scheduler instances prefer Spreading, but the GRM 200 current policy puts more weight on Stacking, then the GRM 200 is configured to sort out the physical hosts in a shortlist for the resource request based on the GRM 200 calculation for each host, with current weights for each host on a vector of scores of <SchedulerSortScore, Spreading, Stacking, AppProximity, ReduceFragment, ReduceInterference, SpreadResilience>, having a heavier weight on Stacking than the others. Each schedule instance 202(1), 202(2) can have a sorter to generate its own sorting score, "SchedulerSortScore", based on similar vector weights or other criteria. In some examples, the GRM 200 respects the individual scheduler instance 202(1), 202(2) sorting score ("SchedulerSortScore") more than others, and can also add more weight on one or a few other scheduler instances' SchedulerSortScore, to steer to preferred directions of the GRM 200.

In example embodiments, the scheduler instance 202(1), 202(2) can send a mini-batch of such scheduled requests to the GRM 200.

Upon receiving shortlists of candidate hosts of scheduled requests from the scheduler instances 202(1), 202(2), the GRM 200 can resolve scheduling conflicts among different types of concurrent resource scheduler instances 202(1), 202(2). In some examples, the GRM 200 can resolve one request at a time using optimistic concurrency. In examples, the GRM 200 can also resolve schedule conflicts in a mini-batch fashion. For example, after receiving a collection of the shortlists from scheduler instances 202(1), 202(2) at a specified resolution time interval or a configurable number of the shortlists, whichever comes first, the GRM 200 can optimize the conflict resolution and physical host selections for the collection of the requests received from any or all of the scheduler instances 202. In some examples, the requests are independent of each other. If the collection contains mixed allocation and reclamation requests, the GRM 200 can consider allocation and reclamation together to maximize the combined scores (for reclamation, optimizing means to minimize or reduce the reclamation cost), including letting an allocation request to use resources reclaimed from a reclamation request.

After resolving the scheduling conflicts, the GRM 200 sends the identifications of the respective physical hosts 204 back to scheduler instances 202(1), 202(2), as well as any results of the scheduling conflict resolution.

Each scheduler instances 202(1), 202(2) communicates with the corresponding types of runtime agents 208(1), 208(2) to launch the different types of runtime instances 210(1), 210(2), using the resources scheduled by the respective scheduler instance 202(1), 202(2) and decided by the GRM 200.

For better performance, reducing conflicts, and avoiding complicated and slow central scheduling in the scheduler instances and the GRM 200, sorting algorithms are kept in the GRM 200 as simple and fast as possible, and some detailed low level resource scheduling is left to the responsibility of the LRM 206 in the physical host 204. The combination and balance of central scheduling and local scheduling can be called hybrid distributive scheduling. In example embodiments, the boundary between central scheduling and local scheduling can be adjusted according to suitability, production system setups and requirements. In some example embodiments, the GRM 200 can automatically adjust (or be configurably adjusted) the boundary of responsibility between the LRM 206 and the GRM 200 to further optimize performance.

Central scheduling by the scheduler instances 202 and the GRM 200 can stay at high-level to qualify and quantify host selections (such as the amounts of CPUsets, CPU cores, GPUs, memory, NUMA nodes, PCIe devices), without micro-scheduling to optimize the detailed placements on the local resources (such as NUMA nodes, memory, CPUsets, CPU cores, GPUs, PCIe devices, and their topology, affinity, and proximity) for each request within a physical host 204. Such simplicity can greatly reduce the conflict chances of the central scheduling at the global level of a cluster.

Local scheduling by the LRM 206 on each physical host 204 can do low-level scheduling (micro-scheduling) to optimize the detailed placements on the local resources (such as NUMA nodes, memory, CPUsets, CPU cores, GPUs, PCIe devices, and their topology, affinity, and proximity) for each request within the physical host 204. The LRM 206 also coordinates and manages local resource sharing, isolation, binding, placement, replacement, migration of the detailed resources for requests within the host, working together with the runtime agent, OS and virtualization/container sub-systems in the host. Since the scale of local scheduling optimization and conflict resolution is reduced from a cluster to a physical host 204, the cloud 100 having the LRM 206 performs more efficiently than when compared to no LRM 206.

The LRM 206 on each physical host 204 makes sure that resources allocated to the runtime instances on the physical host 204 will not exceed the host resource capacities, coordinates among different runtime agents, and makes local scheduling decisions to place/replace/migrate runtime instances on the local resources (such as NUMA nodes, memory, CPUsets, CPU cores, GPUs, PCIe devices, and their topology, affinity, and proximity) in the local physical host 204 to optimize performance, isolation and resource usages. Each LRM 206 communicates with the GRM 200 to report the "heartbeat" of the local host 204 (resource information such as availability and usage information, allocated by the scheduler, actually used by the runtime instances), and synchronize resource allocations scheduled by the scheduler instances and decided by the GRM 200, and actual usages on the local physical host 204.

To optimize workload performance by local scheduling, in example embodiments, the scheduler instance 202 can send workload-NUMA affinity information in a request to the LRM 206 so that the LRM 206 can attempt to meet the workload-NUMA requirement by placing related workloads close to each other for performance locally in the physical host 204.

Different types of runtime agents 208(1), 208(2) on each physical host 204 are configured to communicate with the LRM 206 and their corresponding scheduler instances 202 (1), 202(2), work with OS and virtualization and container sub-systems on the local physical hosts 204, launch and monitor the different types of runtime instances 210(1), 210(2) such as VMs and containers natively for their corresponding scheduler instances 202(1), 202(2).

In an example, the GRM 200 can have a leader instance and multiple parallel worker instances. The multiple parallel worker instances can resolve conflicts in parallel for performance and scalability, e.g. one instance per partition of physical hosts 204. The leader instance can be configured to coordinate the final resolution results determined by the multiple parallel worker instances.

In an example, there can be high-level sharing policies configured among different types of scheduler instances 202(1), 202(2) for resource sharing and conflict resolution, such as elastic-pool-based, scheduler, workload, and priority-based, and others.

Figure 3:
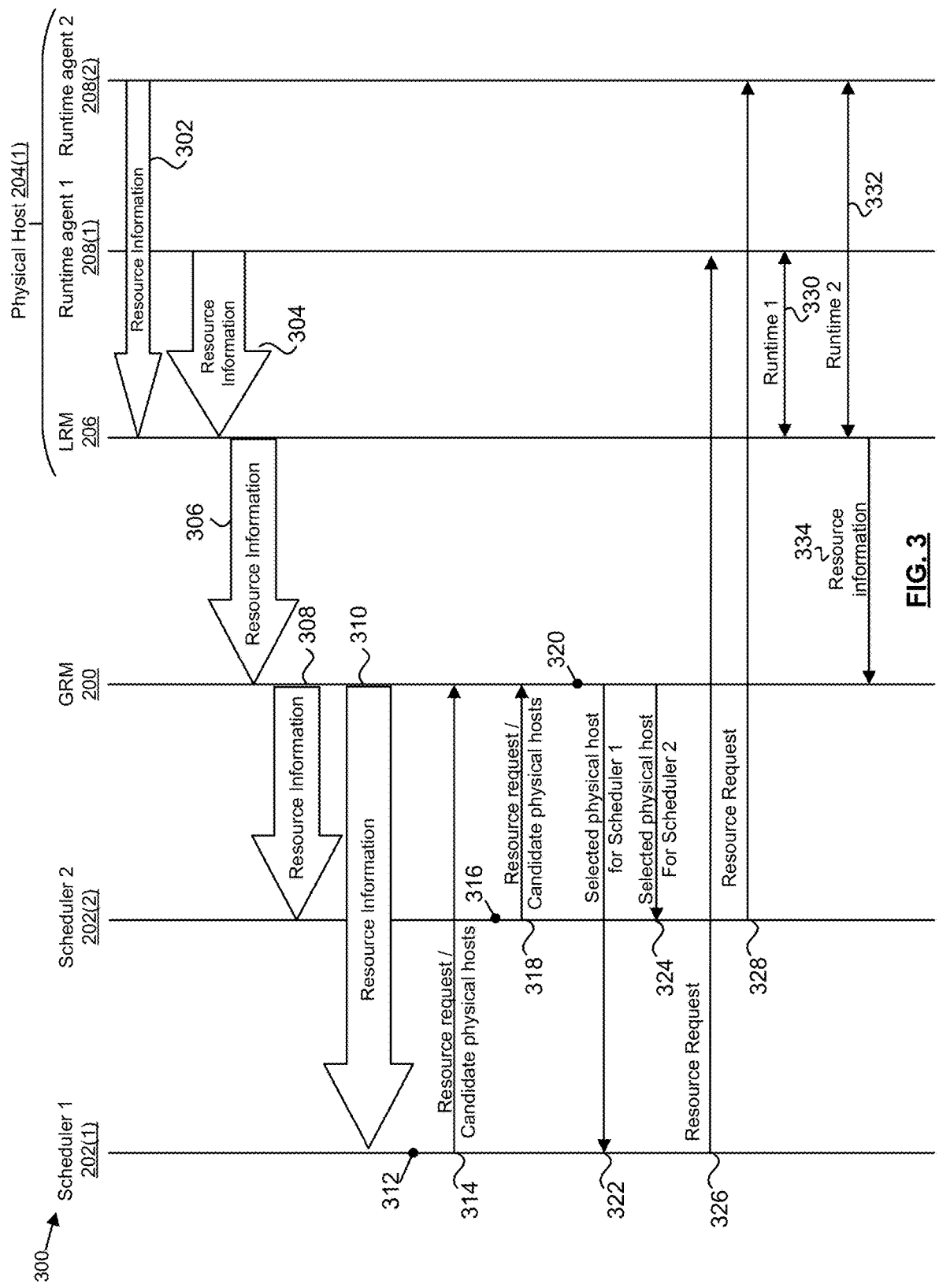
FIG. 3 is a flow diagram illustrating an example method performed by the cloud computing system of FIG. 2, in accordance with an example embodiment.

FIG. 3 is a flow diagram illustrating an example method 300 including messages performed by the cloud 100 for centralized distributive scheduling of multiple scheduler instances 202 and GRM 200, in accordance with an example embodiment. Although some of the steps and messages are shown sequentially and discretely, in some example embodiments some of the steps and messages are performed concurrently. In some example embodiments, some of the steps and messages are performed continuously, intermittently, or repeatedly. In example embodiments, a particular step does not necessarily need to wait for the next step to be completed for the particular step to be repeated or iterated, for example a step may repeatedly receive and process that step prior to or concurrently with the next step, due to ongoing resource requests or informational updates.

The cloud 100 internally communicates capacity, resource information (e.g., availability and usage information) in relation to the physical resources of each physical host 204. The availability information can include available resources of the particular physical host 204, which in simple general terms can generally be considered the total resource capacity for that type of resource of the physical host 204 less the usage of that type of resource as performed on the physical host 204. The GRM 200 is continuously informed of the usage information, the availability information, or both the usage information and the availability information, of each physical host 204. The usage information can be the actual real-time usage information of each physical host 204 or can be the scheduled usage information of the physical host 204, or both. The example of FIG. 3 details the steps for one physical host 204(1), with the understanding to those skilled in the art that the cloud 100 can perform similar processes with other physical hosts 204, and can run scheduler instances 202 and perform runtime instances across different physical hosts 204 in the cluster.

In FIG. 3, the sending of the resource information (e.g., availability and/or usage information) is illustrated using large white arrows to illustrate that the sending can performed continuously or intermittently throughout the method 300. At step 302, the runtime agent 2 (208(2)) sends its resource information to the LRM 206. At step 304, the runtime agent 1 (208(1)) sends its resource information to the LRM 206. Either or both of the runtime agent 1 (208(1)) and runtime agent 2 (208(2)) can also send the total capacity of the physical host 204(1) to the LRM 206 during respective steps 302 and 304. In other examples, the total capacity of the physical host 204(1) is sent at an initial time, or is sent periodically, or is already known by the LRM 206. At step 306, the LRM 206 sends resource information to the GRM 200. The resource information at step 306 can be those that were received from the runtime agents 208(1), 208(2), or can be determined from other processes or runtime instances being run on the physical host 204(1). The resource information at step 306 can be actual or scheduled resource information. The GRM 200 receives resource information from all LRMs of all of the physical hosts 204.

At step 308, the GRM 200 sends resource information to scheduler 2 (202(2)), and at step 310 the GRM 200 sends resource information to scheduler 1 (202(1)). The availability or usage information relates to all of the physical hosts 204. At step 312, scheduler 1 (202(1)) receives resource requests 1 (212(1), see FIG. 2) and, using the received resource information, or the type of resource required when compared to the type of each physical host 204, determines which physical hosts 204 can accommodate the resource allocation of that resource request, called candidate (qualified) physical hosts. The selection of those candidate physical hosts is independent of the resource requests of the other scheduler instances 202 at this point. Other criteria can be used to shortlist the candidate physical hosts. Additional scoring or sorting information of each of the candidate physical hosts can be determined from scheduler 1 (202(1)) at this time as well, e.g. the sorting information is determined from the scoring information of the candidate physical hosts based on ranking by their total score value, or other criteria.

At step 314, scheduler 1 (202(1)) sends identifications of the candidate physical hosts to the GRM 200. In some examples, scheduler 1 (202(1)) also sends to the GRM 200 the scoring or sorting information in relation to each of the candidate physical hosts. For example, the scoring information can be individual weights or total score values of each candidate physical host. For example, the sorting information can be a ranked list of the candidate physical host. Step 316 can be the same as step 312 as performed by scheduler 2 (202(2)) which will generate respective candidate physical hosts for scheduler 2 (202(2)). Step 318 can be the same as step 314 as performed by scheduler 2 (202(2)).

At step 320, the GRM 200 has now received the respective candidate physical hosts from each of the scheduler instances 202 (e.g., scheduler 1 (202(1)) and scheduler 2 (202(2))), as well as the scoring or sorting information of the candidate physical hosts from each of the scheduler instances 202. At step 320, the GRM 200 selects, for each of the scheduler instances 202, a respective physical host from the respective candidate physical hosts. The particular decision for selecting the respective physical host can be based on all of the received requests from the scheduler instances 202 and the capacity, resource information that resolves scheduling conflict of the scheduler instances 202. The particular decision for selecting the respective physical host can also be based on the usage information, actual or scheduled, of each physical host 204.

In some example embodiments, step 320 can be performed in a mini-batch fashion, for example, step 320 can be performed after collecting a critical mass of candidate physical hosts from the schedule instances 202 or after a specified resolution time interval, for example.

In some example embodiments, the GRM 200 performs filtering and determines which of the physical hosts are to be the candidate or qualified physical hosts. In some examples, the GRM 200 performing the filtering can be an alternative to step 312 and step 316, with the scheduler instances 202 not performing any filtering. In most examples, the GRM 200 performing the filtering can be an ultimate decision or further filtering at step 320 that takes into account initial filtering that was proposed by each of the scheduler instances 202 at step 312 and step 316.

In the example shown in FIG. 3, the same physical host 204(1) is selected for both scheduler 1 (202(1)) and scheduler 2 (202(2)). The physical host 204(1) can execute different types of runtime instances for different types of scheduler instances. In other example embodiments, not shown here, different physical hosts 204 are selected for each of scheduler 1 (202(1)) and scheduler 2 (202(2)).

At step 322, the GRM 200 sends an identification of the selected physical host 204(1) to scheduler 1 (202(1)). At step 324, the GRM 200 sends an identification of the selected physical host 204(1) to scheduler 2 (202(2)). In some examples (not shown here), the GRM 200 sends an identification of the selected physical host 204(1) to the LRM 206 of the selected physical host 204(1).

At step 326, scheduler 1 sends, to runtime agent 1 (208(1)) of the identified physical host 204(1), a resource request for runtime of the particular resource request (e.g. from resource requests 1 (212(1)). At step 328, scheduler 2 sends, to runtime agent 2 (208(2)) of the identified physical host 204(1), a resource request for the runtime instance of the particular resource request (e.g. from resource requests 2 (212(2)).

Steps 330 and 332 can be performed concurrently in example embodiments. At step 330, runtime agent 1 (208(1)) runs the runtime instance using the allocated resources. As shown in FIG. 3, step 330 can include the runtime agent 1 (208(1)) working with the LRM 206. For example, the LRM 206 is configured for local arrangement of scheduling and runtime instance execution of the resource request received from scheduler 1 (202(1)). The LRM 206 implements local resource allocation arrangement details, including local scheduling, local conflict resolution and local optimization. In some examples, the local resource allocation arrangement details can include detailed placements on local resources, local resource sharing, isolation, binding, placement, replacement, or migration. The LRM 206 can schedule heterogeneous runtime instances. The LRM 206 performs local resource allocation and can advise the runtime agent 1 (208(1)) which resources to use and when to use those resources. Similarly, step 332 can be performed by runtime agent 2 (208(2)) in collaboration with LRM 206. Step 332 can be performed concurrently with step 330, for a different type of runtime instance than for runtime agent 1 (208(1)).

At step 334, the LRM 206 sends the resource information to the GRM 200 in relation to the actual usage information from implementing the runtime instance of Runtime 1 and Runtime 2. It can be appreciated that step 334 can be an example instance of step 306.

Example embodiments of specific implementations of the cloud 100 will now be described in greater detail. A first example implementation illustrates how the scheduler instances 202 and the GRM 200 work together. A second example implementation illustrates how the GRM 200 resolves filtering and sorting conflicts. Sorting conflicts can also refer to scoring conflicts, depending on the embodiment. A third example implementation illustrates how the LRM 206 performs resource gate-keeping, local resource scheduling and best-effort optimization on its local physical host 204. A fourth example implementation uses high-level sharing policies which uses elastic-pool-based sharing configured among different types of scheduler instances 202, which can help to resolve scheduling conflicts. A fifth example implementation uses scheduler, workload, and priority-based sharing configured among different types of scheduler instances 202, which can help to resolve scheduling conflicts.

A first example implementation will now be described, which illustrates how scheduler instances 202 and the GRM 200 work together.

An OpenStack scheduler instance S1 gets the current global resource usage states of physical hosts 204 in a cluster from the GRM 200, gets a resource request of ResReq1 (2 cores, 4 GB) in terms of CPU cores and GB memory. S1 goes through its filters to get a qualified list of physical hosts that can meet all the constraints and have enough remaining resources, and S1 uses its sorter to sort out the qualified physical hosts that have enough remaining CPU cores and memory, e.g. Host2 (4 cores, 8 GB), Host1 (8 cores, 16 GB), Host3 (16 cores, 32 GB), where the sorting policy is to pack a physical host as tight as possible (minimum remaining resources). S1 cuts off a top-2 shortlist of Host2 (4 cores, 8 GB), Host1 (8 cores, 16 GB) to the GRM 200 for conflict resolution.

A Kubernetes scheduler instance S2 receives the current global resource usage states of physical hosts in a cluster from the GRM 200, receives a resource request of ResReq2 (4 cores, 8 GB) in terms of CPU cores and GB memory. S2 goes through its filters to get a qualified list of physical hosts that can meet all the constraints and have enough remaining resources, and S2 uses its sorter to sort out the qualified physical hosts that have enough remaining CPU cores and memory, e.g. Host2 (4 cores, 8 GB), Host3 (16 cores, 32 GB), Host4 (16 cores, 32 GB), Host5 (32 cores, 64 GB), where the sorting policy is to pack a physical host as tight as possible (minimum remaining resources). S2 cuts off a top-3 shortlist of Host2 (4 cores, 8 GB), Host3 (16 cores, 32 GB), Host4 (16 cores, 32 GB) to the GRM 200 for conflict resolution.

The GRM 200 receives from S1 the shortlist for ResReq1, the GRM 200 finds the related physical hosts' current remaining resources in the global resource usage states are Host2 (4 cores, 8 GB), Host1 (6 cores, 12 GB). The GRM 200 decides to allocate Host2's resources to ResReq1 (2 cores, 4 GB), with a deduction in Host2 so that Host2's remaining resources become Host2 (2 cores, 4 GB) in the global resource usage states.

The GRM 200 receives from S2 the shortlist for ResReq2, the GRM 200 finds the related physical hosts' current remaining resources in the global resource usage states are Host2 (2 cores, 4 GB), Host3 (16 cores, 32 GB). Because Host2 cannot meet ResReq2 (4 cores, 8 GB) now, the GRM 200 decides to allocate Host3's resources to ResReq2, with a deduction in Host3 so that the remaining resources become Host2 (2 cores, 4 GB), Host1 (6 cores, 12 GB), Host3 (12 cores, 24 GB), Host4 (16 cores, 32 GB) in the global resource usage states.

The above-described selection of Host2 and Host3 by the GRM 200 are in the case when the GRM 200 resolves the shortlists of S1 and S2 sequentially one by one, or in case they are missed in the same mini-batch time window. In another example embodiment, the GRM 200 can process resource requests using mini-batch. If the resource requests from S1 and S2 are received in the same mini-batch time window, the GRM 200 can do some optimization such as using a min-host-max-request-first packing policy through the current states of Host2 (4 cores, 8 GB), Host1 (6 cores, 12 GB), Host3 (16 cores, 32 GB), Host4 (16 cores, 32 GB) by sorting small-host-first of all candidate hosts in the mini-batch, and then picking large-request-first it decides to allocate Host2's resources to ResReq2 (4 cores, 8 GB), and Host1's resources to ResReq1 (2 cores, 4 GB). Note that Host1 is not qualified for ResReq2, and Host3 and Host4 are not qualified for ResReq1. After deduction, there are remaining resources of Host2 (0 cores, 0 GB), Host1 (4 cores, 8 GB), Host3 (16 cores, 32 GB), Host4 (16 cores, 32 GB) in the global resource usage states, which has less fragmented remaining memory than the result of resolving the shortlists of S1 and S2 sequentially one by one.

The first example implementation allows heterogeneous scheduler instances 202(1), 202(2) and their runtime instances to share physical hosts 204 with combining central parallel scheduling and local micro-scheduling which can greatly increase resource utilization and scheduling performance, and reduce the resource cost and request waiting time.

Existing heterogeneous scheduler instances and their runtime instances in different ecosystems can be readily adapted with the GRM 200 and scheduler instances 202 as microservices without having to be re-implemented. Design and engineering effort can be saved with integration of the GRM 200 and scheduler instances 202, and allow them continue evolving in their ecosystems.

A second example implementation will now be described, which illustrates how the GRM 200 resolves filtering and sorting conflicts.

For a resource request ResReq (2 cores, 4 GB), a scheduler instance 202(1), using Spreading sorting policy, cuts off a top-3 shortlist of Host3 (16 cores, 32 GB), Host4 (8 cores, 16 GB), Host2 (4 cores, 8 GB) to the GRM 200. The scheduler instance 202(1) also has a sorter that generates a score vector of <SchedulerSortScore, Spreading, Stacking> for each candidate physical host 204 in the shortlist. For example, ScoreVector(Host3)=<9, 7, 3>, ScoreVector (Host4)=<8, 5, 4>, ScoreVector(Host2)<7, 3, 6> is sent by the scheduler instance 202(1) to the GRM 200.

In an example, the GRM 200 has a filtering conflict resolution policy of a qualification rule to resolve filtering conflicts to disqualify candidate physical hosts. The rule can be, for example, "any physical host that has a number of unused GPUs is disqualified to be allocated to a resource request that does not require GPUs." Such a rule prevents expensive unused GPUs on a physical host from being wasted because other less resources such as CPUs are used up on this physical host. Filtering through the candidate physical hosts, the GRM 200 finds out Host4 has unused GPUs so that Host4 is disqualified. The GRM 200 also has a sorting conflict resolution policy to prefer Stacking for sorting, and without running its own sorter. The GRM 200 sorting policy puts more weight on Stacking than others in <SchedulerSortScore, Spreading, Stacking>, e.g. WeightOnScoreVector<10, 2, 20> which respects SchedulerSortScore but prefers Stacking even more. Then the final scores for each candidate physical host are: FinalScore (Host3)=10*9+2*7+20*3=164; FinalScore(Host2)=10*7+ 2*3+20*6=196. Based on the sorting result of the final scores, ResReq(2 cores, 4 GB) is most likely assigned to Host2 that has the highest score 196.

In the second example implementation, the GRM 200 resolves filtering and sorting conflicts and has consistent scheduling filtering and sorting policies, while still respecting each scheduler instances' sorting scores and other common sorting criteria.

In an example, the GRM 200 resolves scoring or sorting conflicts from the received scoring or sorting information between the candidate physical hosts, prior to the selecting of the final physical host from the respective candidate physical host. In an example, the GRM 200 resolves the scoring or sorting conflicts based on cost of each of the plurality of physical hosts. In an example, the GRM 200 filters out at least one of the received respective candidate physical hosts as unqualified physical hosts prior to the selecting of the final physical host from the respective candidate physical hosts.

A third example implementation will now be described, which illustrates how the LRM 206 performs resource gate-keeping, local resource scheduling and best-effort optimization on the respective local physical host 204 for workload-NUMA affinity on the physical host 204. The example implementation presumes the physical host 204 has enough memory for VMs so that only the CPU cores need to be considered.

A physical host 204(1) has 2 NUMA nodes, NUMA1 and NUMA2, each has 8 cores. NUMA1 has a VM1 of 2 cores being used, and 6 cores available. NUMA2 has 4 cores being used, and 4 cores available.

A new VM of 4 cores with preference on one NUMA node is assigned to this physical host 204(1). The LRM 206 puts this VM on NUMA2. Now NUMA1 has 6 cores available. NUMA2 has 0 core available.

A new VM of 10 cores is assigned to this host. The LRM 206 sees this VM's required 10 cores>the currently available 6 cores on this host, and rejects this VM to be started on this physical host 204(1), which may be mistakenly scheduled to this physical host 204(1) for some data synchronization error temporarily.

A previous running VM of 2 cores on NUMA2 is finished. Now NUMA1 has 6 cores available. NUMA2 has 2 cores available.

A new VM2 of 8 cores with preference on one or two NUMA nodes is assigned to this physical host 204(1). The LRM 206 checks if VM1 on NUMA1 has one NUMA preference and used a lot of memory. If yes, the LRM 206 will put VM2 on NUMA1 and NUMA2. If not, the LRM 206 will migrate VM1 from NUMA1 to NUMA2, and put VM2 on NUMA1.

The third example balances the central scheduling by the GRM 200 with local scheduling by the LRM 206 for central scheduling and conflict-resolution performance, as well as local optimization of workload performance and resource utilization.

A fourth example implementation will now be described, which uses high-level sharing policies which uses elastic-pool-based sharing configured among different types of scheduler instances 202, which can help to resolve scheduling conflicts.

In a cluster of many physical hosts 204, scheduler instances 202(1) of scheduler Type1 maintain a host pool POOL1 that initially contains 0 host. Scheduler instances 202(2) of scheduler Type2 maintain a host pool POOL2 that initially contains 0 host. There may be more than two of such scheduler instances 202 in the cluster.

Each physical host 204 in the cluster initially is idle (i.e., no resource is allocated to any workload by any scheduler), and does not belong to any host pools. The GRM 200 can be configured to define sharing policies among the scheduler types of the scheduler instances 202. For examples, one scheduler type can use a percentage or limit number of physical hosts 204 in the cluster. If a scheduler instance of this scheduler type asks the GRM 200 for more than the percentage or limit of physical hosts in the cluster, or there is no idle physical host in the cluster, the GRM 200 will return an error to reject it.

A Type1 scheduler instance 202(1) receives a resource request 212(1). The scheduler instance 202(1) first tries to schedule the resource request to any physical host in POOL1. If the scheduler instance 202(1) finds no physical host in POOL1 can meet the request, the scheduler instance 202(1) asks the GRM 200 for an idle physical host in the cluster which can meet the request. If the scheduler instance 202(1) gets an idle host, the scheduler instance 202(1) will mark the idle host belonging to POOL1, then schedule the resource request to the idle host. The idle host is now assigned and reserved for POOL1 and any resource requests of Type1. Otherwise the scheduler instance 202(1) will return an error to the relevant resource request 212(1) that no resource can be allocated to the request.

Similarly, a Type2 scheduler instance 202(2) receives and schedules a resource request 212(2) with POOL2, and operations is performed by the GRM 200 in a similar manner as described in relation to Type1.

When the GRM 200 resolve conflicts in the example embodiments with pooled resources, the GRM 200 only needs to resolve conflicts among scheduler instances 202 of the same scheduler type, because different scheduler types use different host pools which do not overlap. Optionally, in an example embodiment, each scheduler type can have its own conflict resolver among its instances without going through the GRM 200 for the conflict resolution.

Periodically, a Type1 scheduler instance 202(1) or Type2 scheduler instance 202(2) will check if there are idle hosts in its respective host pool. If yes, the scheduler instance 202(1), 202(2) will unmark the idle hosts and release them from its host pool back to the GRM 200 in the cluster.

Periodically a Type1 scheduler instance 202(1) or Type2 scheduler instance 202(2) will check if the scheduler instance 202(1), 202(2) can make a host idle in its host pool by migrating workloads running on the presently running physical host to another physical host in the host pool. If yes and after migration, the scheduler instance 202(1), 202(2) can then unmark and release the present physical host from its host pool back to the GRM 200 in the cluster.

A fifth example implementation will now be described, which uses scheduler, workload, and priority-based sharing configured among different types of scheduler instances 202, which can help to resolve scheduling conflicts.

The GRM 200 can define the scheduler types and workload types, for example, VM scheduler, container scheduler, x86 workload, advanced reduced instruction set computer (RISC) machine (ARM) workload, latency-sensitive workload, batch workload. The GRM 200 can then have a conflict probability between two types of scheduler instance and workload, which can be defined by configuration or estimated by machine learning from historical data. For example, the conflict probability between x86 workloads and ARM workloads is 0.

In an example, the GRM 200 can also optionally determine scores and sorting information among the different types of scheduler instance and workload. The sorting information can be calculated based on the scheduler type or the currently-being scheduled workload type. For example, an on-demand VM request has a higher sorting value than a spot VM request. A latency-sensitive workload request has a higher sorting value than a batch workload request. The sorting can be also optionally adjusted based on some dynamic data. An example of such dynamic data is a sum of weighted amounts of resources used by the scheduler type or workload type, raising the sorting value if a certain scheduler type or workload type are using less resources than others.

In an example, the GRM 200 receives a number of requests in a mini-batch for resource conflict resolution. The GRM 200 may resolve the scheduling conflicts in groups (i.e., mini-groups for the mini-batch). For resource requests that have high conflict probabilities among them, the GRM 200 can use more pessimistic concurrency control (such as transaction or locking) to resolve the conflicts in the group. For resource requests that have low conflict probabilities among them, the GRM 200 can use more optimistic concurrency control (such as lock-free and retry) to resolve the conflicts in the group. For resource requests that have zero conflict probabilities among them such as x86 workloads and ARM workloads, the GRM 200 can resolve the conflicts in separate groups in parallel.

If a group of conflicting requests contains high-sorting valued requests such as on-demand VMs and low-sorting value ones such as spot VMs, the GRM 200 sorts the requests based on the received sorting information. The GRM 200 resolves conflicts for the high-sorting valued requests first. The GRM 200 then resolves conflicts for the low-sorting valued requests.

In the fifth example, high-level sharing policies are used to resolve conflicts in groups, either in host groups such as elastic-pools, or in scheduler, workload, and priority-based groups. The high-level sharing polices can help to reduce the scope of conflict resolution, and can increase the performance. Using sorting values can have better scheduling control and balance on different priority-based requests.

Figure 4:
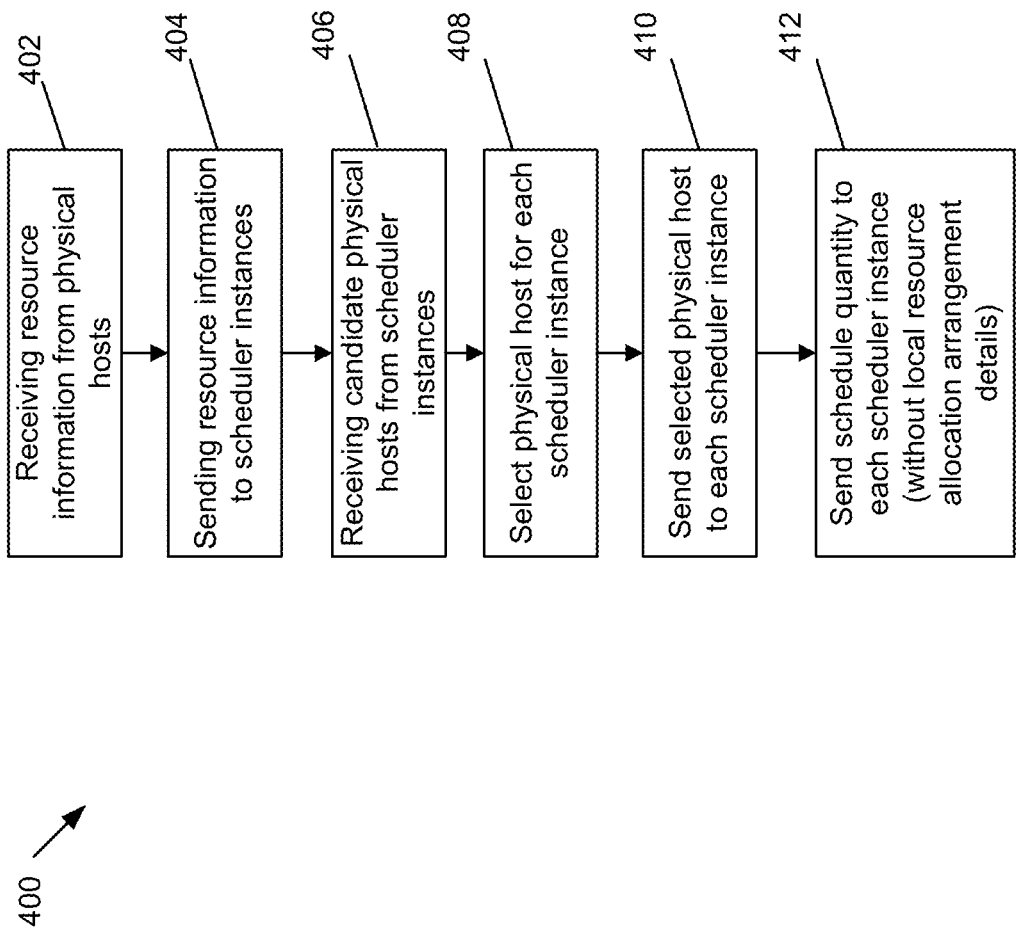
FIG. 4 is a flow diagram illustrating an example method performed by a global resource manager (GRM) of the cloud computing system, in accordance with an example embodiment.

FIG. 4 is a flow diagram illustrating an example method 400 performed by the GRM 200, in accordance with an example embodiment. The GRM 200 communicates with the physical hosts 204 and the scheduler instances 202, in which each scheduler instance 202 has a respective resource request that requires resource allocation.

At step 402, the GRM 200 receives resource information (e.g., allocation information or usage information) from a local resource manage 206 on the physical hosts 204. At step 404, the GRM 200 sends the received resource information to the schedule instances 202. At step 406, the GRM 200 receives, from each of the scheduler instances, respective candidate physical hosts that can accommodate the resource allocation of that scheduler instance 202 independent of the other scheduler instances 202. At step 408, the GRM 200 selects, for each scheduler instance 202, a respective physical host from the respective candidate physical hosts based on the scheduler instances 202 and the resource information that resolves scheduling conflict of the respective resource request of the plurality of scheduler instances. At step 410, the GRM 200 sends, to the scheduler instances 202, an identification of the selected respective physical host 204 to run at least one runtime instance of the respective resource request scheduled by that scheduler instance 202. In an example (not shown here), the GRM 200 also sends, to the local resource manager 206 of the selected respective physical host 204, that the selected respective physical host 204 is to run at least one runtime instance of the respective resource request.

In an example, the method 400 further includes the GRM 200 reserving resources on the first at least one of the physical hosts 204 in the first resource pool for resource requests of the first type of runtime instances and reserving resources on the second at least one of the physical hosts 204 in the second resource pool for resource requests of the second type of runtime instances.

In an example, the method 400 further includes the GRM 200 releasing the reserved resources on the first at least one of the physical hosts 204 or the second at least one of the physical hosts 204 in the respective resource pool when reserved resources on the physical hosts 204 are no longer needed.

In an example, the method 400 further includes migrating workloads from one of the first at least one physical hosts 204 to another of the first at least one physical hosts 204 to cause the one of the first at least one physical hosts 204 to be idle so that the physical host 204 can be reserved in a resource pool.

Figure 5:
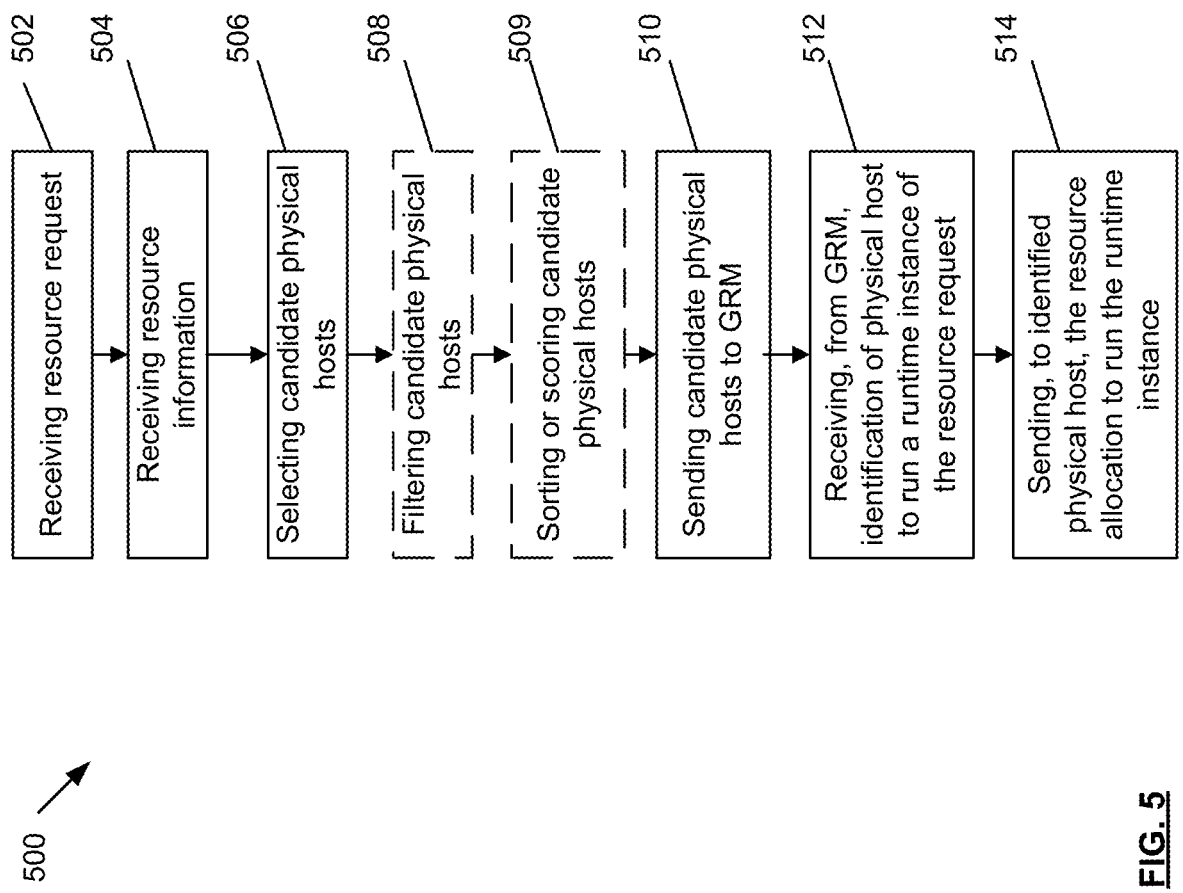
FIG. 5 is a flow diagram illustrating an example method performed by a scheduler instance of the cloud computing system, in accordance with an example embodiment.

FIG. 5 is a flow diagram illustrating an example method 500 performed by a scheduler instance (e.g. Scheduler 1 (202(1))) for facilitating the centralized distributive scheduling of one type of runtime instance on the physical hosts 204, in accordance with an example embodiment.

At step 502, Scheduler 1 (202(1)) receives a resource request for a resource allocation. At step 504, Scheduler 1 (202(1)) receives resource information of a plurality of physical hosts 204. At step 506, Scheduler 1 (202(1)) selects, based on the resource information, an identification of respective candidate physical hosts that can accommodate the resource allocation of the resource request independent of resource requests of other scheduler instances.

In some example embodiments, at step 508, Scheduler 1 (202(1)) also filters out unqualified physical hosts in order to determine qualified physical hosts as the respective candidate physical hosts.

In some example embodiments, at step 509, Scheduler 1 (202(1)) also scores or sorts the respective candidate physical hosts and generates scoring or sorting information. In such instances, Scheduler 1 (202(1)) also sends the scoring or sorting information to the GRM 200.

At step 510, Scheduler 1 (202(1)) sends the resource request and the identification of the respective candidate physical hosts to the GRM 200. At step 512, Scheduler 1 (202(1)) receives from the global resource manager, an identification of a physical host 204 from the respective candidate physical hosts that resolves scheduling conflict. At step 514, Scheduler 1 (202(1)) sends, to a runtime agent of the identified physical host 204, the resource allocation for the identified physical host 204 to run at least one runtime instance of the resource allocation.

Figure 6:
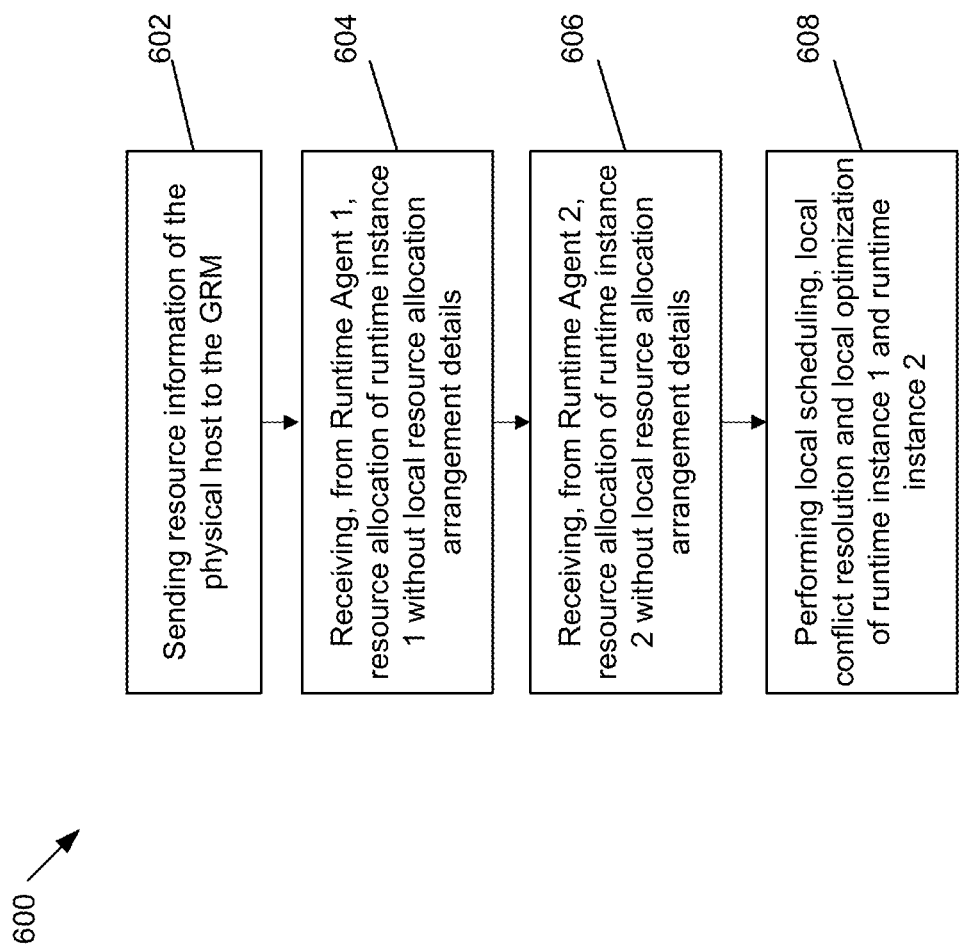
FIG. 6 is a flow diagram illustrating an example method performed by a local resource manager (LRM) of one of the physical hosts, in accordance with an example embodiment.

FIG. 6 is a flow diagram illustrating an example method 600 performed by the LRM 206 of one of the physical hosts 204(1) for facilitating the centralized distributive scheduling of multiple scheduler instances 202, in accordance with an example embodiment.

At step 602, the LRM 206 sends resource information (e.g. availability or usage information) of the respective physical host 204 to the GRM 200. At step 604, the LRM 206 receives, from runtime agent 1 (208(1)) and without receiving local resource allocation arrangement details, a scheduled quantity of first resource allocation for the physical host 204 to run at least one first runtime instance of runtime agent 1 (208(1)). In some examples (not shown here), the LRM 206 receives the first resource allocation from the GRM 200 rather than the runtime agent 1 (208(1)). At step 606, the LRM 206 receives, from runtime agent 2 (208(2)) and without receiving the local resource allocation arrangement details, a scheduled quantity of second resource allocation without the local resource allocation arrangement details for the physical host 204 to run at least one second runtime instance of runtime agent 2 (208(2)). In some examples (not shown here), the LRM 206 receives the second resource allocation from the GRM 200 rather than the runtime agent 2 (208(2)).

At step 608, the LRM 206 performs local scheduling, local conflict resolution and local optimization within the physical host 204 for concurrent running of the at least one first runtime instance and the at least one second runtime instance that resolves scheduling conflict of the at least one first runtime instance and the at least one second runtime instance.

The example embodiments described above may be implemented by using hardware only or by using software and a necessary universal hardware platform. Based on such understandings, the technical solution of some example embodiments may be embodied in the form of a software product. The software product may be stored in a non-volatile or non-transitory storage medium, which can be a compact disk read-only memory (CD-ROM), Universal Serial Bus (USB) flash disk, or a removable hard disk. The software product includes a number of instructions that enable a computer device (personal computer, server, or network device) to execute the methods provided in the example embodiments. The software product may additionally include a number of instructions that enable a computer device to execute operations for configuring or programming a digital logic apparatus in accordance with example embodiments.

Example apparatuses and methods described herein, in accordance with example embodiments, can be implemented by one or more controllers. The controllers can comprise hardware, software, or a combination of hardware and software, depending on the particular application, component or function. In some example embodiments, the one or more controllers can include analog or digital components, and can include one or more processors, one or more non-transitory storage mediums such as memory storing instructions executable by the one or more processors, one or more transceivers (or separate transmitters and receivers), one or more signal processors (analog or digital), and one or more analog circuit components.

In the described methods or block diagrams, the boxes may represent events, steps, functions, processes, modules, messages, and/or state-based operations, etc. Although some of the above examples have been described as occurring in a particular order, it will be appreciated by persons skilled in the art that some of the steps or processes may be performed in a different order provided that the result of the changed order of any given step will not prevent or impair the occurrence of subsequent steps. Furthermore, some of the messages or steps described above may be removed or combined in other embodiments, and some of the messages or steps described above may be separated into a number of sub-messages or sub-steps in other embodiments. Even further, some or all of the steps may be repeated, as necessary. Elements described as methods or steps similarly apply to systems or subcomponents, and vice-versa. Reference to such words as "sending" or "receiving" could be interchanged depending on the perspective of the particular device.

The above discussed embodiments are considered to be illustrative and not restrictive. Example embodiments described as methods would similarly apply to systems, and vice-versa.

Variations may be made to some example embodiments, which may include combinations and sub-combinations of any of the above. The example embodiments presented above are merely examples and are in no way meant to limit the scope of this disclosure. Variations of the innovations described herein will be apparent to persons of ordinary skill in the art, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to include all suitable changes in technology.

What is claimed is:

1. A method for scheduling and conflict resolution, performed by a global resource manager, comprising:

receiving, from a local resource manager on each of a plurality of physical hosts, resource information of that physical host;

receiving, from each of a plurality of scheduler instances each having a respective resource request, respective candidate physical hosts that can accommodate resource allocation of that scheduler instance independent of the other scheduler instances;

receiving a conflict resolution request from at least one of the plurality of scheduler instances;

selecting, for at least one of the scheduler instances, a respective physical host from the respective candidate physical hosts based on the scheduler instances and the resource information that resolves scheduling conflict of the respective resource request of the plurality of scheduler instances, the selecting being performed for a mini-batch of the received conflict resolution request from the at least one of the plurality of scheduler instances of the respective candidate physical hosts within a specified time interval; and sending, to the at least one of the scheduler instances, an identification of the selected respective physical host to run at least one runtime instance of the respective resource request scheduled by that scheduler instance.

2. The method as claimed in claim 1, wherein first at least one of the scheduler instances is for a first type of runtime instances and second at least one of the scheduler instances is for a second type of runtime instances that is a same type as the first type of runtime instances.

3. The method as claimed in claim 1, wherein first at least one of the scheduler instances is for a first type of runtime instances and second at least one of the scheduler instances is for a second type of runtime instances that is a different type than the first type of runtime instances.

4. The method as claimed in claim 3, wherein the selecting further comprises selecting first at least one of the physical hosts for the first at least one of the scheduler instances and selecting second at least one of the physical hosts for the second at least one of the scheduler instances, wherein the first at least one of the physical hosts are different than the second at least one of the physical hosts.

5. The method as claimed in claim 3, further comprising reserving resources on the first at least one of the physical hosts in a first resource pool for resource requests of the first type of runtime instances and reserving resources on the second at least one of the physical hosts in a second resource pool for resource requests of the second type of runtime instances.

6. The method as claimed in claim 5, further comprising releasing the reserved resources on the first at least one of the physical hosts or the second at least one of the physical hosts in the respective resource pool when the reserved resources on the respective physical host are no longer needed.

7. The method as claimed in claim 5, further comprising migrating workloads from the first at least one of the physical hosts to another at least one of the physical hosts to cause the first at least one of the physical hosts to have more resources idle so that the resource of the respective physical host can be reserved in the respective resource pool.

8. The method as claimed in claim 3, wherein the first type of runtime instances is one type of virtual machines, containers, pods, or nodes; and the second type of runtime instances is a different type of the virtual machines, the containers, the pods, or the nodes.

9. The method as claimed in claim 1, wherein the selecting further comprises selecting a same physical host for first at least one of the scheduler instances and second at least one of the scheduler instances.

10. The method as claimed in claim 1, wherein each scheduler instance is configured to cut off unqualified physical hosts in order to determine qualified physical hosts as the respective candidate physical hosts.

11. The method as claimed in claim 10, wherein the unqualified physical hosts are one type of physical hosts that are more expensive than another type of physical hosts that is determined as the qualified physical hosts.

12. The method as claimed in claim 1, wherein the selecting of the respective physical host is for at least two of the scheduler instances, and wherein the sending of the identification of the selected respective physical host is to at least two of the scheduler instances.

13. The method as claimed in claim 1, further comprising, after the receiving the resource information, sending the resource information to the scheduler instances.

14. The method as claimed in claim 1, further comprising repeating the receiving of the resource information to monitor the at least one runtime instance.

15. The method as claimed in claim 1, wherein the resource allocation includes a reclamation of resources from one of the physical hosts.

16. The method as claimed in claim 1, wherein the resource information includes real-time actual resource usage information or scheduled resource allocation information of the respective physical host.

17. The method as claimed in claim 1, wherein the sending to at least one of the scheduler instances includes sending a scheduled quantity of the resource allocation for the selected respective physical host, and without sending local resource allocation arrangement details for the at least one runtime instance on the selected respective physical host.

18. The method as claimed in claim 1, wherein each respective local resource manager receives information from the global resource manager and runtime agents on that physical host, and is configured to perform local resource allocation arrangement for that physical host without receiving local resource allocation arrangement details.

19. The method as claimed in claim 18, wherein the local resource allocation arrangement details include local scheduling, local conflict resolution and local optimization.

20. The method as claimed in claim 18, wherein the local resource allocation arrangement details include detailed placements on local resources, local resource sharing, isolation, binding, placement, replacement, or migration.

21. The method as claimed in claim 18, wherein at least one physical host is configured with a plurality of non-uniform memory access nodes, wherein the local resource allocation arrangement details for the at least one physical host include migrating local resource allocation from a first non-uniform memory access node to a second non-uniform memory access node.

22. The method as claimed in claim 1, further comprising receiving, from each of the plurality of scheduler instances, scoring or sorting information of the respective candidate physical hosts for that scheduler instance, wherein the selecting of the respective physical host for that scheduler instance is further based on the received scoring or sorting information.

23. The method as claimed in claim 22, wherein the scoring or sorting information is generated by the respective scheduler instances based on: spreading, stacking, application proximity, fragment reduction, interference reduction, or spread resilience, or a combination or sub-combination thereof;
 wherein the scoring information includes weights for ranking the respective candidate physical hosts from one or more of the spreading, the stacking, the application proximity, the fragment reduction, the interference reduction, or the spread resilience.

24. The method as claimed in claim 22, further comprising the global resource manager resolving scoring or sorting conflicts from the received scoring or sorting information between the candidate physical hosts prior to the selecting of the respective physical host from the respective candidate physical hosts.

25. The method as claimed in claim 24, wherein the resolving scoring or sorting conflicts is based on cost of each of the plurality of physical hosts.

26. The method as claimed in claim 1, further comprising the global resource manager filtering out at least one of the received respective candidate physical hosts as unqualified physical hosts prior to the selecting of the respective physical host from the respective candidate physical hosts.

27. The method as claimed in claim 1, wherein the selecting of the respective physical host from the respective candidate physical hosts for that scheduler instance is further based on optimizing the resource allocation or reclamation costs of all of the scheduler instances;
 wherein the optimizing includes optimizing performance, isolation and resource usage of the physical hosts.

28. The method as claimed in claim 1, wherein the scheduling conflict is resolved by spreading, stacking, application proximity, fragment reduction, interference reduction, or spread resilience, or a combination or sub-combination thereof;
 wherein the scheduling conflict is resolved by weighting one or more of the spreading, the stacking, the application proximity, the fragment reduction, the interference reduction, or the spread resilience.

29. The method as claimed in claim 1, wherein the resource information includes allocation information, usage information, or both the allocation information and the usage information.

30. The method as claimed in claim 1, wherein the selecting of the respective physical host from the respective candidate physical hosts selects less than all of the plurality of physical hosts.

31. The method as claimed in claim 1, further comprising sending, to the local resource manager of the selected respective physical host, that the selected respective physical host is to run at least one runtime instance of the respective resource request.

32. A method for facilitating scheduling and conflict resolution, the method performed by a local resource manager of a physical host, comprising:
 sending resource information of the physical host to a global resource manager;
 receiving, from a first runtime agent or from the global resource manager, without receiving local resource allocation arrangement details, a scheduled quantity of first resource allocation for the physical host to run at least one first runtime instance of the first runtime agent; and
 receiving, from a second runtime agent of a different type than the first runtime agent, or from the global resource manager, without receiving the local resource allocation arrangement details, a scheduled quantity of second resource allocation for the physical host to run at least one second runtime instance of the second runtime agent; and performing local scheduling, local conflict resolution and local optimization within the physical host for concurrent running of the at least one first runtime instance and the at least one second runtime instance that resolves scheduling conflict of the at least one first runtime instance and the at least one second runtime instance.

* * * * *